(12) United States Patent
Jordan et al.

(10) Patent No.: US 12,210,967 B2
(45) Date of Patent: Jan. 28, 2025

(54) COGNITIVE COMPUTING METHODS AND SYSTEMS BASED ON BIOLOGICAL NEURAL NETWORKS

(71) Applicant: ALPVISION S.A., Vevey (CH)

(72) Inventors: Frederic Jordan, Vevey (CH); Martin Kutter, Vevey (CH); Yves Delacretaz, Vevey (CH)

(73) Assignee: ALPVISION S.A., Vevey (CH)

( * ) Notice: Subject to any disclaimer, the term of this patent is extended or adjusted under 35 U.S.C. 154(b) by 907 days.

(21) Appl. No.: 17/274,020

(22) PCT Filed: Sep. 8, 2019

(86) PCT No.: PCT/EP2019/073911
§ 371 (c)(1),
(2) Date: Mar. 5, 2021

(87) PCT Pub. No.: WO2020/049182
PCT Pub. Date: Mar. 12, 2020

(65) Prior Publication Data
US 2021/0334657 A1      Oct. 28, 2021

Related U.S. Application Data

(60) Provisional application No. 62/728,765, filed on Sep. 8, 2018.

(51) Int. Cl.
*G06F 17/00* (2019.01)
*G06N 3/00* (2023.01)
(Continued)

(52) U.S. Cl.
CPC .............. *G06N 3/08* (2013.01); *G06N 3/002* (2013.01); *G06N 3/061* (2013.01)

(58) Field of Classification Search
CPC .......... G06N 3/08; G06N 3/002; G06N 3/061; G06N 20/20; G06N 3/0445; G06N 3/0454; G06N 3/126; G06N 5/003
(Continued)

(56) References Cited

U.S. PATENT DOCUMENTS 7,947,626 B2    5/2011  Ma et al.
2003/0208451 A1*  11/2003  Liaw ...................... G06N 3/049
                                                                 706/22
(Continued)

FOREIGN PATENT DOCUMENTS

WO    WO 2018/081657    5/2018

OTHER PUBLICATIONS

Angus et al., "Optogenetic Methods in Drug Screening: Technologies and Applications", Current Opinion in Biotechnology, vol. 48, pp. 8-14 (2017).
(Continued)

*Primary Examiner* — Jason T Edwards
(74) *Attorney, Agent, or Firm* — DLA Piper LLP (US)

(57) ABSTRACT

A Biological Neural Network (BNN) core unit comprising a neural cell culture, an input stimulation unit, an output readout unit may be controlled through its various life cycles to provide data processing functionality. An automation system comprising an environmental and chemical controller unit adapted to operate with the BNN stimulation and readout data interfaces facilitates the monitoring and adaptation of the BNN core unit parameters. Pre-processing and post-processing of the BNN interface signals may further facilitate the training and reinforcement learning by the BNN. Multiple BNN core units may also be assembled together as a stack. The proposed system provides a BNN Operating System as a core component for a wetware server to receive, process and transmit data for different client
(Continued)

applications without exposing the BNN core unit components to the client user while requiring significantly less energy than conventional silicon-based hardware and software information processing for high-level cognitive computing tasks.

17 Claims, 22 Drawing Sheets

(51) Int. Cl.
   *G06N 3/06* (2006.01)
   *G06N 3/08* (2023.01)
(58) Field of Classification Search
   USPC .......................................................... 706/15
   See application file for complete search history.

(56) References Cited

U.S. PATENT DOCUMENTS

| | | | |
|---|---|---|---|
| 2004/0131998 | A1 | 7/2004 | Marom et al. |
| 2007/0048731 | A1* | 3/2007 | Colicos .............. G01N 21/6454 435/287.2 |
| 2008/0294096 | A1* | 11/2008 | Uber, III ............. A61M 31/005 604/66 |
| 2008/0299201 | A1* | 12/2008 | Kozloski ................ A45D 27/46 607/2 |
| 2012/0107921 | A1* | 5/2012 | Willson ................. C12M 41/48 47/1.4 |
| 2013/0171116 | A1* | 7/2013 | Shoham ................. C12M 31/00 435/325 |
| 2013/0325776 | A1* | 12/2013 | Ponulak ................. G06N 20/00 700/250 |
| 2014/0279772 | A1 | 9/2014 | Pennewitz et al. |
| 2016/0273354 | A1* | 9/2016 | Chen ........................ E21B 49/08 |
| 2017/0286401 | A1* | 10/2017 | He .......................... G06F 17/16 |
| 2017/0292961 | A1* | 10/2017 | Cohen .................. G01N 33/502 |
| 2017/0313987 | A1* | 11/2017 | Petcavich ........... A61L 27/3804 |
| 2018/0075345 | A1* | 3/2018 | Gottfried .............. G06N 3/049 |
| 2018/0189567 | A1* | 7/2018 | Maheriya ............ G09B 21/007 |
| 2018/0257297 | A1* | 9/2018 | Matheu ............... A61L 27/3625 |
| 2019/0034564 | A1* | 1/2019 | Narcross ................ G06N 3/049 |
| 2020/0054221 | A1* | 2/2020 | Ward ................... A61B 5/7207 |

OTHER PUBLICATIONS

Ballini et al., "A 1024-Channel CMOS Microelectrode Array with 26,400 Electrodes for Recording and Stimulation of Electrogenic Cells in Vitro", IEEE J. Solid-State Circuits, vol. 49, No. 11, pp. 2705-2719, Nov. 2014.
Barral et al., "Optogenetic Stimulation and Recording of Primary Cultured Neurons with Spatiotemporal Control", Bio-Protocol, vol. 7, No. 12, Jun. 20, 2017 (19 pages).
DeMarse et al., "Adapticve Flight Control with Living Neuronal Networks on Microelectrode Arrays", 2005 IEEE International Joint Conference on Neural Networks, (2005) (4 pages).
Garfinkel, "Biological Computing", MIT Technology Review, May 1, 2000 (14 pages).
Han, "Computing with Simulated and Cultured Neuronal Networks", National University of Singapore (2013) (187 pages).
Joung et al., "3D Printed Stem-Cell Derived Neural Progenitors Generate Spinal Cord Scaffolds", Adv. Funct. Mater., vol. 28, No. 39, Sep. 26, 2018 (21 pages).
Lancaster, "Brain Organoids get Vascularized", Nature Biotechnology, vol. 36, No. 5, pp. 407-408, May 2018.
Mansour et al., "An in vivo Model of Functional and Vascularized Human Brain Organoids", Nat. Biotechnol., vol. 36, No. 5, pp. 432-411, Jun. 2018.
Mauri et al., "Evaluation of RGD Functionalization in Hybrid Hydrogels as 3D Neural Stem Cell Culture Systems", Biomaterials Science, vol. 6, No. 3, pp. 501-510 (2018).
Murphy et al., "Scaffolds for 3D in vitro Culture of Neural Lineage Cells", Acta Biomaterialisa, vol. 54, pp. 1-20, May 2017.
MaxWell Biosystems, "Neuronal Networks", https://www.mxwbio.com/applications/neuronal-networks/applications/neuronal-networks/, printed on May 16, 2022 (4 pages).
Park et al., "Three-Dimensional Brain-on-a-Chip with an Interstitial Level of Flow and iits Applciation as an in vitro Model of Alzheimer's Disease", Lab on a Chip, vol. 15, pp. 141-150 (2015).
Pasca, "The Rise of Three-Dimensional Human Brain Cultures", Nature, vol. 553, pp. 437-445 (2018).
Pham et al., "Generation of Human vascularized Brain Organoids", Neuroreport, vol. 29, No. 7, pp. 588-593, May 2, 2018.
International Search Report Issued in PCT/EP2019/0739112019 mailed Dec. 12, 2019 (3 pages).
Written Opinion Issued in PCT/EP2019/073911 mailed Dec. 12, 2019 (9 pages).

* cited by examiner

COGNITIVE COMPUTING METHODS AND SYSTEMS BASED ON BIOLOGICAL NEURAL NETWORKS

CROSS REFERENCE TO RELATED APPLICATIONS

This application is a U.S. National Stage Application of International Application No. PCT/EP2019/073911 filed Sep. 8, 2019, which claims priority from U.S. Patent Application No. 62/728,765 filed Sep. 8, 2018. The entirety of all the above-listed applications are incorporated herein by reference.

TECHNICAL FIELD

The present disclosure relates to cognitive computing systems, methods and processes to perform a diversity of high-level, complex cognitive tasks mimicking and extending the biological brain functions. The proposed cognitive computing systems, methods and processes employ a plurality of neural cells as their biotechnology core processing elements in combination with brain-on-chip interfaces and controllers to complement and interact with more conventional information technology networks and computing architectures.

BACKGROUND

With the tremendous development of information technology (IT) in the past few decades, plenty of methods and systems are now available to perform a diversity of computational tasks, such as calculation, data optimization, data classification, natural language processing and translation, image and video processing and recognition. Recent cognitive computing developments including machine learning, deep learning, artificial neurocomputing with neural networks mimicking biological neural networks. The latter further attempts at providing artificial intelligence as an aid to humans in all their tasks such as for instance object and facial recognition, natural language processing (NLP) and sentiment analysis, at home, in social media as well as at work, as well as in environments hostile to humans such as deep seas, space, nuclear reactors, and others. High performance computing, high throughput computing and high availability systems and infrastructures are thus offered as cloud computing services by large firms such as Google (Google Cloud Platform), Amazon (Amazon Web Services AWS) and Microsoft (Azure). Facebook and Apple also run their own private data centers in carefully chosen data farm sites worldwide where they can benefit from affordable and reliable electric power. However, one major limitation of current silicon-based computing environments, which include software and hardware, is the excessively high power they require to execute complex cognitive tasks. The power consumption of silicon-based system is order of magnitudes higher than for biological system, for instance brains, of similar performance. Another limitation is the requirement of at least some explicit logical programming and structured data representations which make them today not suitable to implement concepts not yet understood and modelled by human science, such as higher-level cognitive processes, creative thinking, and consciousness.

A neural network can be seen as a mean to create a spatio-temporal mapping between 2 spaces of different dimensions. In a configuration where there is a smaller number of outputs than the number of inputs, a neural network thus creates a simplified expression of a problem in a space with limited dimensions. As examples, well known spatial transforms are: the Hough transforms, which maps a 2D space to a two-parameters voting space; the Fourier transform, which maps a time periodic signal into its frequency representation; the wavelets class of transforms, which maps an image to a scale-space representation. Of course, these transforms are well described by mathematics and can be implemented directly and even if a neural network can be used for that, it is unlikely to be the most computationally efficient choice. However, for instance in the case of a multivariate input space of 1000 dimensions producing only 10 relevant variables at output, explicit mathematical solving is usually too complex. Neural networks are good candidates to solve such problems. Still, the necessary internal states-space dimensionality for solving such a problem may be huge, and require too much computing resources on current hardware technology.

As an alternative to conventional software and hardware information technology, wetware solutions based on biological components such as cultured cells instead of transistors have been explored primarily by academics as early as in the end of the $20^{th}$ century (https://www.technologyreview.com/s/400707/biological-computing/). Most scientists have so far focused on the how to achieve basic functions similar to essential core IT processes logical gates, calculation, and memory storage for instance with DNA computing (https://www.nature.com/subjects/dna-computing). As promising as this track may be, especially with recent developments in synthetic biology and DNA editing technologies, the engineering path to build higher order cognitive processes from such basic functions remains as challenging as with conventional silicon-based logic.

Examples of high-level cognitive functions are the functions required for a general intelligence machine to pass the Turing test. Current research using Artificial Neural Networks (ANN) to this end faces at least two major limitations:

State of the art multilayered networks used in deep learning are lacking temporal flexibility compared to Biological Neural Networks (BNN). The human brain is basically a biological multi-core system for which no mathematical modelling is available. Most of the powerful mathematics which are used in the greatest scientific models like quantum mechanics or general relativity are useless in this case. State of the art recurring spiking neural networks (SNN) cannot be trained on complex tasks and cannot be simulated at large scale, primarily because of the lack of computing efficiency of digital processing. Since all neurons are working intrinsically in parallel, they basically represent up to 100 billion (if for instance we assume that the average human brain has about 100 billion neurons) processors. It may be possible to replicate this processing power if each neuron represents only 1 Flop of computing power, but in practice the accuracy of the neuron simulation required to achieve the Turing test goal is unknown: if in the order of magnitude of 100 Mflops per neuron, then it is impossible to implement it with the current technology. Indeed the best computing power is around 1E16 Flops and $100E9 \times 100E6 = 1E11 \times 1E8 = 1E19$ which is about 1000 times more computing power than what is available on the best high performance computing system in the world. Even a non-real-time simulation would be too slow to achieve any meaningful results in a decent time. The computing efficiency of biological brains is also several orders of magnitudes higher than digital computers: for instance, a brain typically consumes 20 W for 100 billion neurons (5 billion neurons/W), while digital simulations require several orders of magnitude more power even for simple neuron models such as the integrate & fire spiking neurons.

Therefore, rather than replicating high-level cognitive processes with AI using silicon based digital computation, an emerging alternate approach consists in using biological neural networks. Recent progress in biotechnology now facilitates the culture and assembly of biological neural networks out of embryonic stem cells such as rat embryonic stem cells, as well as from differentiated human Induced Pluripotent Stem cells (IPSc). The cultured BNN may then be stimulated and read using Multi-Electrode Arrays (MEA). So far, the primary use of MEAs is for application to develop neuron and brain models for the purpose of pharmacology, pharmaceutical testing and toxicological studies, as well as better understanding common brain diseases such as Alzheimer and Parkinson. Other industrial applications have also been proposed in the past few years. An application of BNN to the aircraft control was for instance proposed by DeMarse et al. in *Adaptive Flight Control With Living Neuronal Networks on Microelectrode Arrays*, in Proceedings IEEE International Joint Conference on Neural Networks, 2005. U.S. Pat. No. 7,947,626 by the US Navy discloses a passaged progenitor cell derived neural network MEA which may be used to detect and/or quantify various biological or chemical toxins. Along the same track, Koniku (www.koniku.com), the first company to develop wetchips as computing chips based on cultured neural cells, has been commercializing highly specialized products since 2017 for the detection of odorant compounds in security, military and agriculture/food markets. As described in their patent application WO 2018/081657, neuron cells may be modified by various biotechnology processes such as gene editing, methylation editing, and others, to express a unique odorant receptor profile with cell-surface receptors, as known from biology state of the art. Neuron cells may be interfaced with a computer by means of state-of-the-art neurophysiology interfaces, such as MEA (Multi Electrode Arrays) electrodes. The computer may then measure the electrical signal produced by the neural cells when exposed to an odorant compound in a dedicated chamber and detect the presence of certain odorant compounds by conventional signal processing methods, possibly comprising artificial neural networks (ANN) and machine learning classifiers for training and classification. ANN are particularly useful to discriminate between multiple signals when a network of different neurons with different odorant receptor characteristics is employed in a real environment possibly involving complex combinations of multiple detectable compounds. One major limitation of such an approach is that it is limited to a very specific sensory application.

US patent application US20140279772 by Baker Hughes discloses the use of a cultured biological neural network in an apparatus for processing signals downhole, conveyed in a container into an earth formation through a borehole. The biological neural network is interfaced with MEA electrodes to receive input signals from sensors and to output measurements out of the neural network. The proposed BNN system also comprises environmental control components, such as a nutrition dispenser. While this disclosure mentions advantages of BNN over conventional computing systems in a challenging environment in terms of parallel computing power, robustness to vibration and electrical noise, and self-healing capability, it does not explicit how to manage the system over time and in particular dynamic learning processes. It is rather highly specialized to a specific application, so that preprocessing learning can be applied as an off-line preparation process, rather than in the challenging run-time environment.

In his 2013 PhD thesis entitled *Computing with simulated and cultured neuronal networks*, Ju Han from the University of Singapore explored the capability of dissociated neuronal cultures of 18 day rat embryo cortical cells in the context of the state-dependent computation paradigm, and showed that random networks formed by living neurons are able to process complex spatiotemporal information and suitable for implementing a prototype of neurocomputer device based on the LSM (Liquid State Machine) paradigm. To test the ability of the neuronal cultures to classify temporal patterns and complex spatiotemporal patterns, two stimuli were designed: jittered spike train template classification task, which is a benchmark test of the LSM, and classification of randomly composited piano music. Processing temporal inputs relies on fading memory, and Ju Han observed that short-term memory in dissociated neuronal cultures can be longer than 4 seconds in his setup. In order to control the neuronal culture, both in terms of stimulating inputs to the neurons and recording outputs of the neurons, Ju Han employed optogenetics (light stimulation of genetically modified neurons) combined with multielectrode arrays (MEA). While MEA can both provide electrical stimulation (BNN input) and measurement (BNN output) at a low spatial and temporal resolution, optogenetics enable more precise stimulation control, contact-free manipulation, and repetitive interrogation of neurons, so this field has further developed as an intensive area of research in the past five years. Examples of recent optogenetic stimulation advances can be found in the review of *Optogenetic methods in drug screening: technologies and applications* by Agus and Janovjak, Curr. Opin. Biotechnol., December 2017., and in *Optogenetic Stimulation and Recording of Primary Cultured Neurons with Spatiotemporal Control* by Banal and Reyes, Bio Protoc, August 2017, describing a fast video projector based on the workings of a Digital Micromirror Device (DMD) which enables to spatially focus the light stimulation down to single neurons while enabling temporal display patterns at 1.44 kHz and beyond.

In order to optimize the overall functionality of the BNN system, Ju Han proposed to further control the biological cultured unit with standard machine learning approaches (genetic algorithms in particular) to define the electrical stimulations and processing in order to ultimately achieve high level functions. Instead of a single neuron readout as often considered in neuroscience experiments, a network layer output may be read and processed as a multivariate signal (for instance with MEA electrophysiology measurement probes, in combination with signal processing software such as Matlab).

Further recent research in neuroscience and neurocomputing has highlighted that biological neuronal systems need learning processes just as the brain to develop their computing capability. In his 2013 PhD thesis, Ju Han pointed out that biological neuronal systems are able to learn or be engineered, possibly through light stimulation too, and that this learning capability of the network together with drug manipulations, form a possible step to optimize neural circuits for computation. The BNN system may be trained to produce behaviors specified by the reference model through reinforcement learning, for instance by releasing global reward or punishment signals based on behavioral results feedback. Ju Han proposed for instance to use NDMA receptor antagonist drug treatment for reinforcement learning.

More generally, beyond open-loop systems as still widely used in neuroscience experiments, closed-loop systems could be designed just as in regular automation system engineering. Current state-of-the-art BNN systems are tailor-made for very specific applications at a small scale and thus suffer from two major limitations in view of using them as unitary components in an overall, general-purpose wetware computing system with adaptive (to different needs) and evolutive (over time) high-level cognitive capability: their architecture is limited to a unitary input (single neuron or layer stimulation with a predefined setup and protocol) and output layer design (single neuron or layer measurement with a predefined biological or signal processing method); and their inherent network connectivity, once developed with or without preliminary training, can only process one function at a time.

There is therefore a need for novel solutions and architectures to leverage the inherent high-level cognitive processing capability of biological neural networks as a low-power alternative or co-processing complement to more conventional silicon-based information technology processing systems, devices, software and electronic chips.

BRIEF SUMMARY

Automated processing systems are described for transforming a spatio-temporal input data signal into a spatio-temporal output data signal, the system comprising: an in vitro biological culture of neural cells (BNN core unit), an input stimulation unit (SU) adapted to apply an input spatio-temporal stimulation signal into a first set of the neural cells, an output readout unit (RU) adapted to capture an output spatio-temporal readout signal from a second set of the neural cells, one or more nutrient tanks in connection with one or more nutrient dispensers to inject one or more nutrients into the biological neural cell culture, one or more additive tanks each in connection with one or more additive dispensers to inject one or more additives into the BNN culture, one or more nutrient waste collectors for filtering and expelling nutrient waste from the BNN culture, one or more additive waste collectors for filtering and expelling additive waste from the BNN culture, one of more vascularization networks to connect said nutrient dispensers, additive dispensers, nutrient waste collectors and additive waste collectors to the BNN culture, one or more sensors to measure at least one environmental parameter of the BNN culture, and an automation controller configured to adapt the stimulation signal to the input data signal, to adapt the output data signal to the readout signal and to control at least one of a BNN core unit environmental parameter, a BNN neural cell culture nutrient supply, a BNN neural cell culture additive supply, a BNN neural cell culture nutrient waste collection, a BNN neural cell culture additive waste collection so as to maintain the homeostasis of the BNN neural cell culture over time such that the spatio-temporal input data signal is continuously transformed into the spatio-temporal output data signal.

The automation controller may comprise a pre-processing unit to transform, with at least one of a spatio-temporal signal filter, a spatio-temporal signal classifier, a machine learning algorithm based on a mathematical or statistical model, an artificial neural network, a convolutional neural network, a support vector machine classifier, a random forest classifier, a genetic algorithm, a genetic programming algorithm, or a reservoir computing method, the input data signal into the stimulation signal.

The automation controller may comprise a post-processing unit to transform with at least one of a spatio-temporal signal filter, a spatio-temporal signal classifier, a machine learning algorithm based on a mathematical or statistical model, an artificial neural network, a convolutional neural network, a support vector machine classifier, a random forest classifier, a genetic algorithm, a genetic programming algorithm, or a reservoir computing method, the readout signal into the output data signal.

Methods are also described for transforming a spatio-temporal input data signal into a spatio-temporal output data signal with an automation controller and a Biological Neural Network (BNN) core unit, the BNN core unit comprising at least an in vitro culture of neural cells adapted, with an input stimulation unit (SU), to feed a stimulation spatio-temporal signal into a first set of the neural cells and adapted, with an output readout unit (RU), to readout a spatio-temporal signal from a second set of the neural cells, the method comprising; pre-processing, with the automation controller, the spatio-temporal input data signal to form the stimulation spatio-temporal signal; post-processing, with the automation controller, the readout spatio-temporal signal to form the spatio-temporal output data signal; and controlling at least one of the BNN core unit environmental parameters, the BNN neural cell culture nutrient supply, the BNN neural cell culture additive supply, the BNN neural cell culture nutrient waste collection, the BNN neural cell culture additive waste collections, a pre-processing parameter or a post-processing parameter so as to maintain the homeostasis of the BNN neural cell culture over time such that the BNN core unit continuously transforms the spatio-temporal input data signal into the output spatio-temporal readout signal.

The methods may also comprise minimizing the error between the output data signal and a target output data signal by adapting at least one of the BNN core unit environmental parameters, the BNN neural cell culture nutrient supply, the BNN neural cell culture additive supply, the BNN neural cell culture nutrient waste collection, the BNN neural cell culture additive waste collection, a pre-processing parameter, or a post-processing parameter.

SHORT DESCRIPTION OF THE FIGURES

FIG. 1 depicts the core BNN unit as a building block of a biological computing server.

FIG. 2a)b)c)d)e) present different arrangements and manufacturing options to assemble the core BNN unit.

Figure 9A:
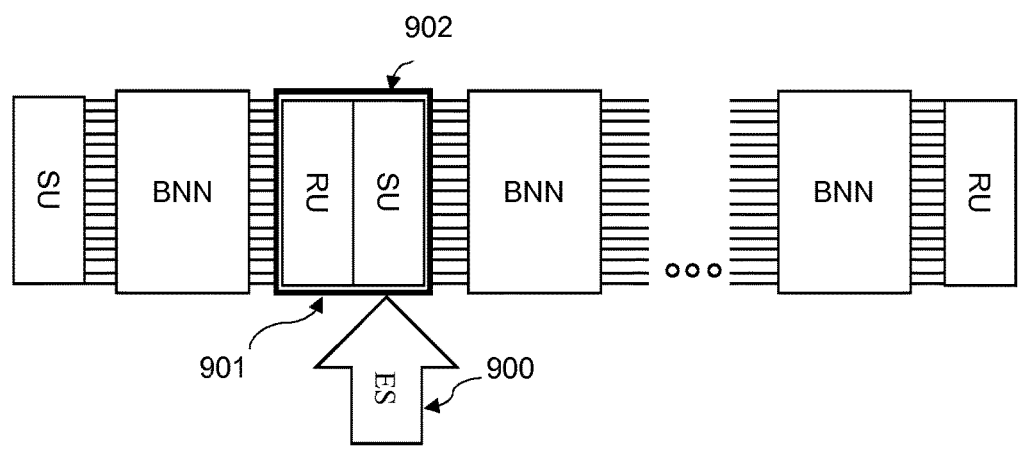
Figure 9B:
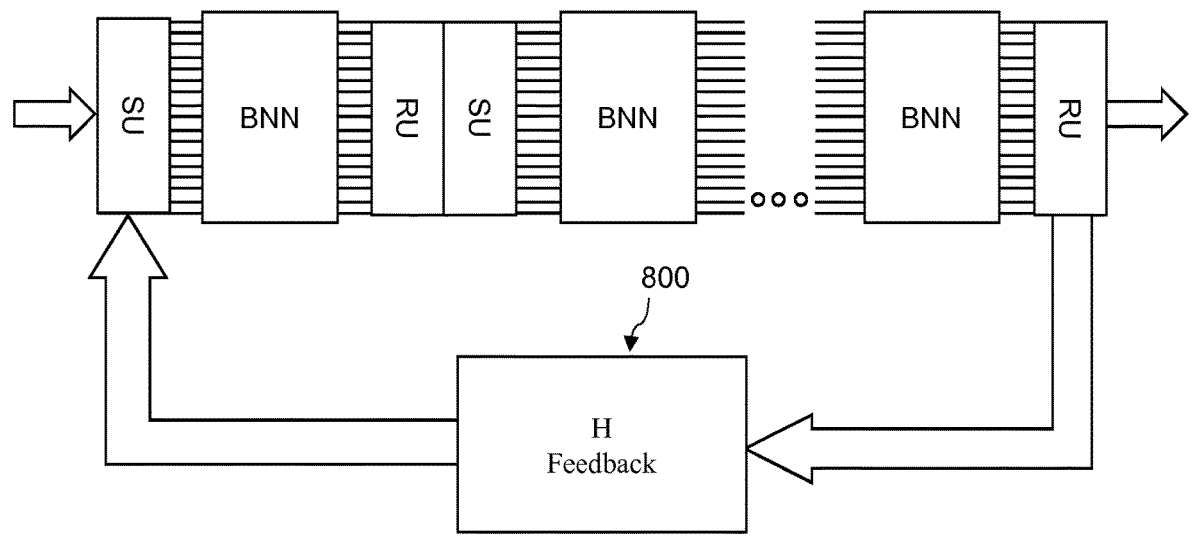

FIG. 9a) and FIG. 9b) show possible embodiments of a BNN Biological Computing Stack (BCS).

Figure 10A:
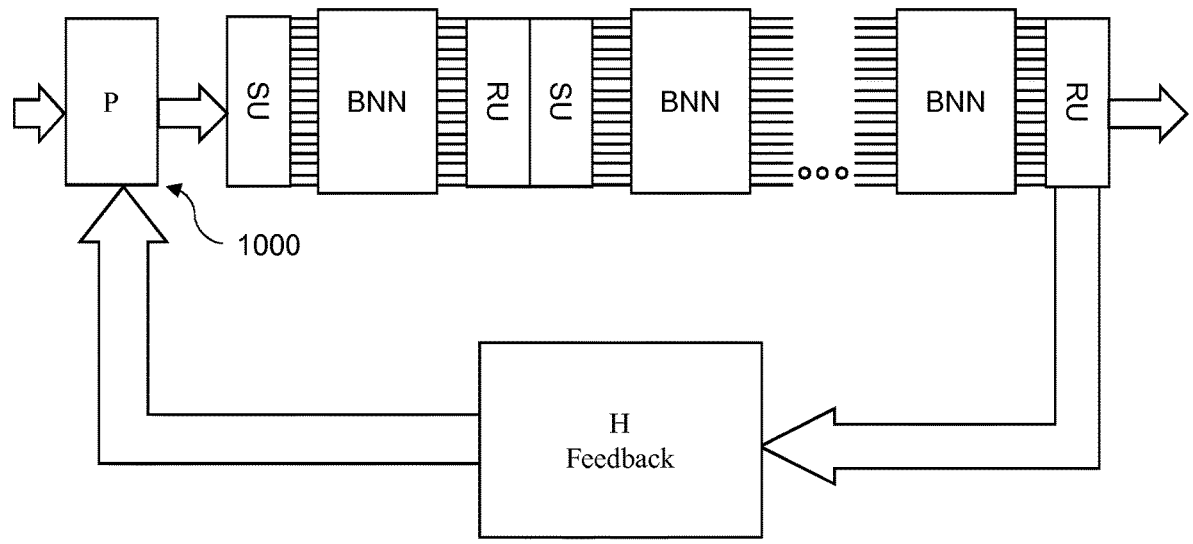
Figure 10B:
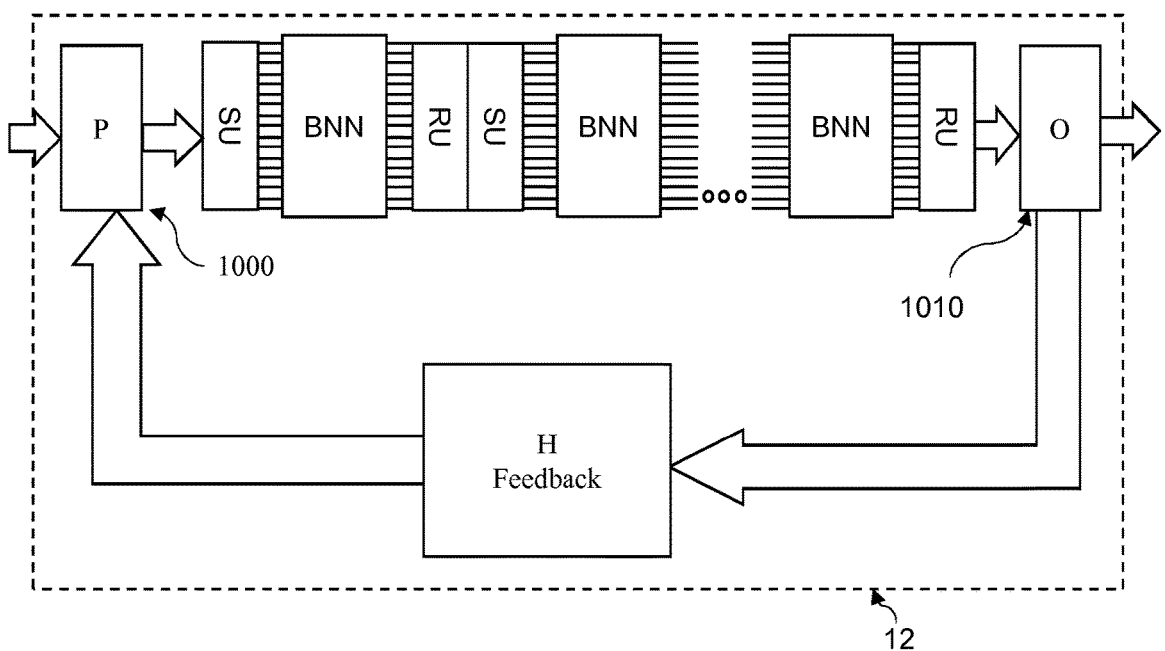

FIG. 10a) and FIG. 10b) show possible embodiments of a BNN Biological Computing Stack (BCS) suitable for training (T-BCS).

Figure 11:
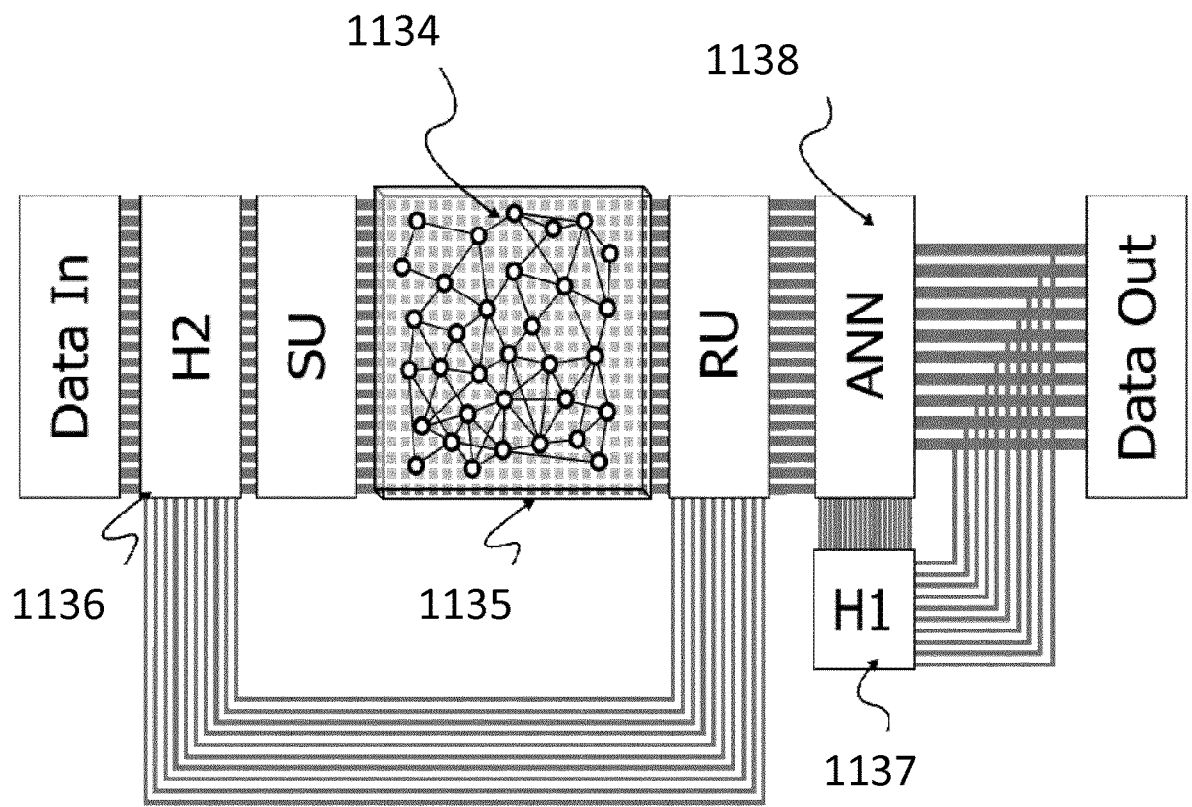

FIG. 11 show an exemplary T-BCS realization with an ANN.

Figure 12:
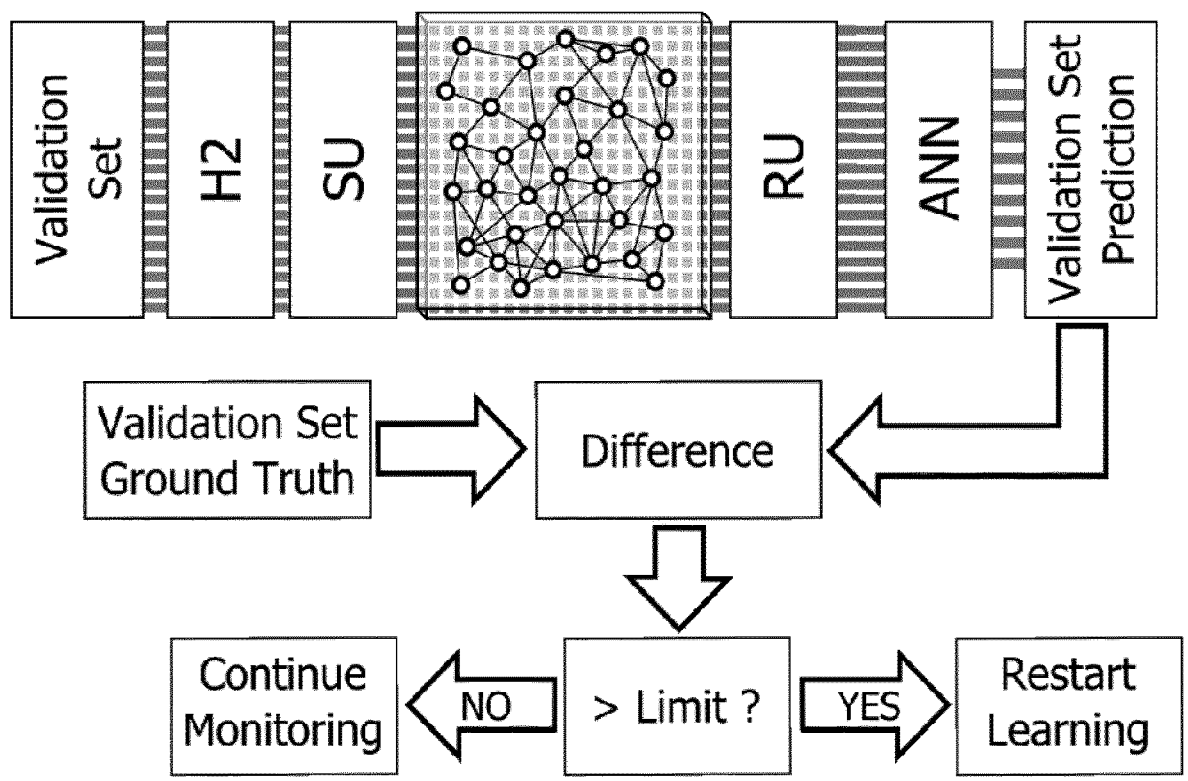

FIG. 12 illustrates a possible maintenance process for the T-BCS.

Figure 13:
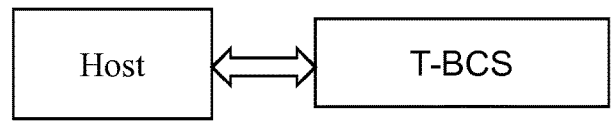

FIG. 13 shows a host server operating with the T-BCS wetware architecture.

Figure 14:
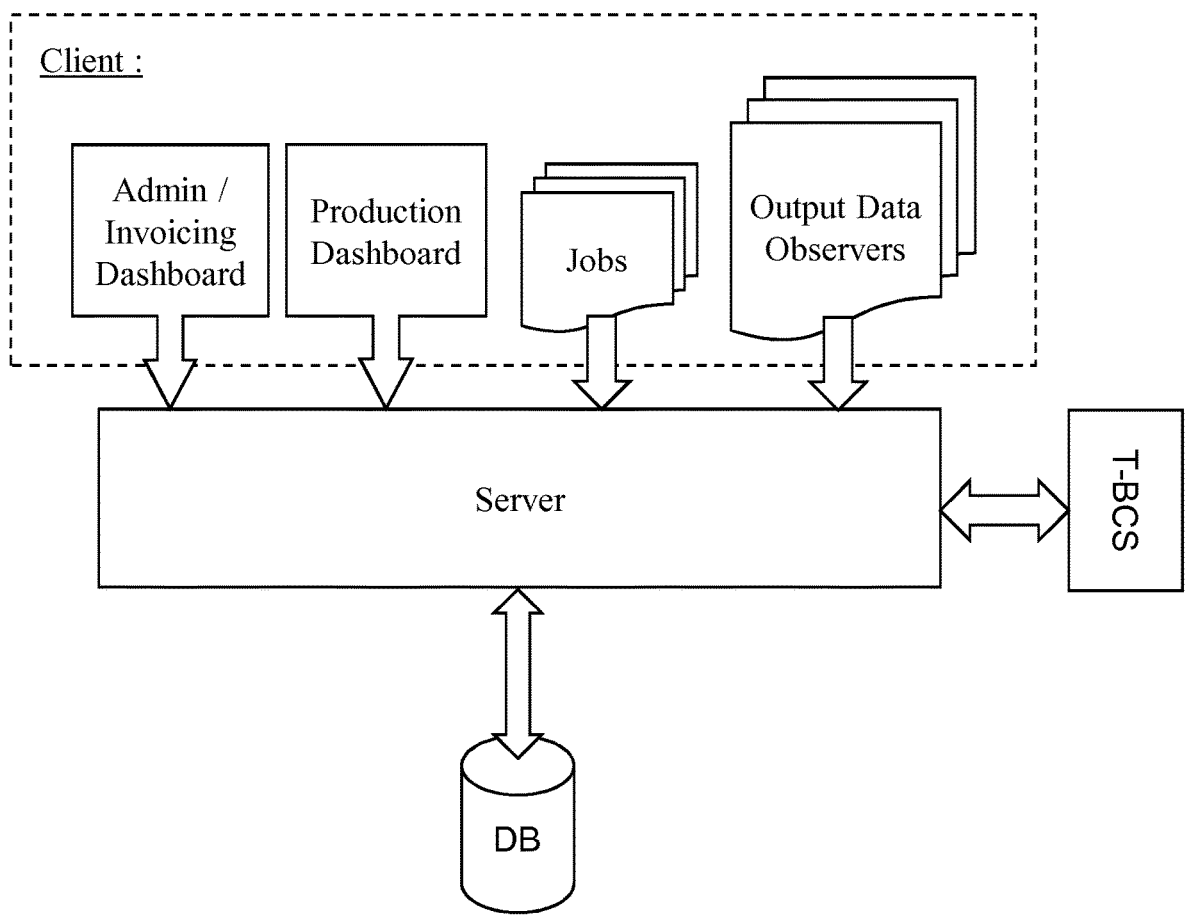

FIG. 14 depicts possible functions as may be operated by the host server to manage a user client.

Figure 15:
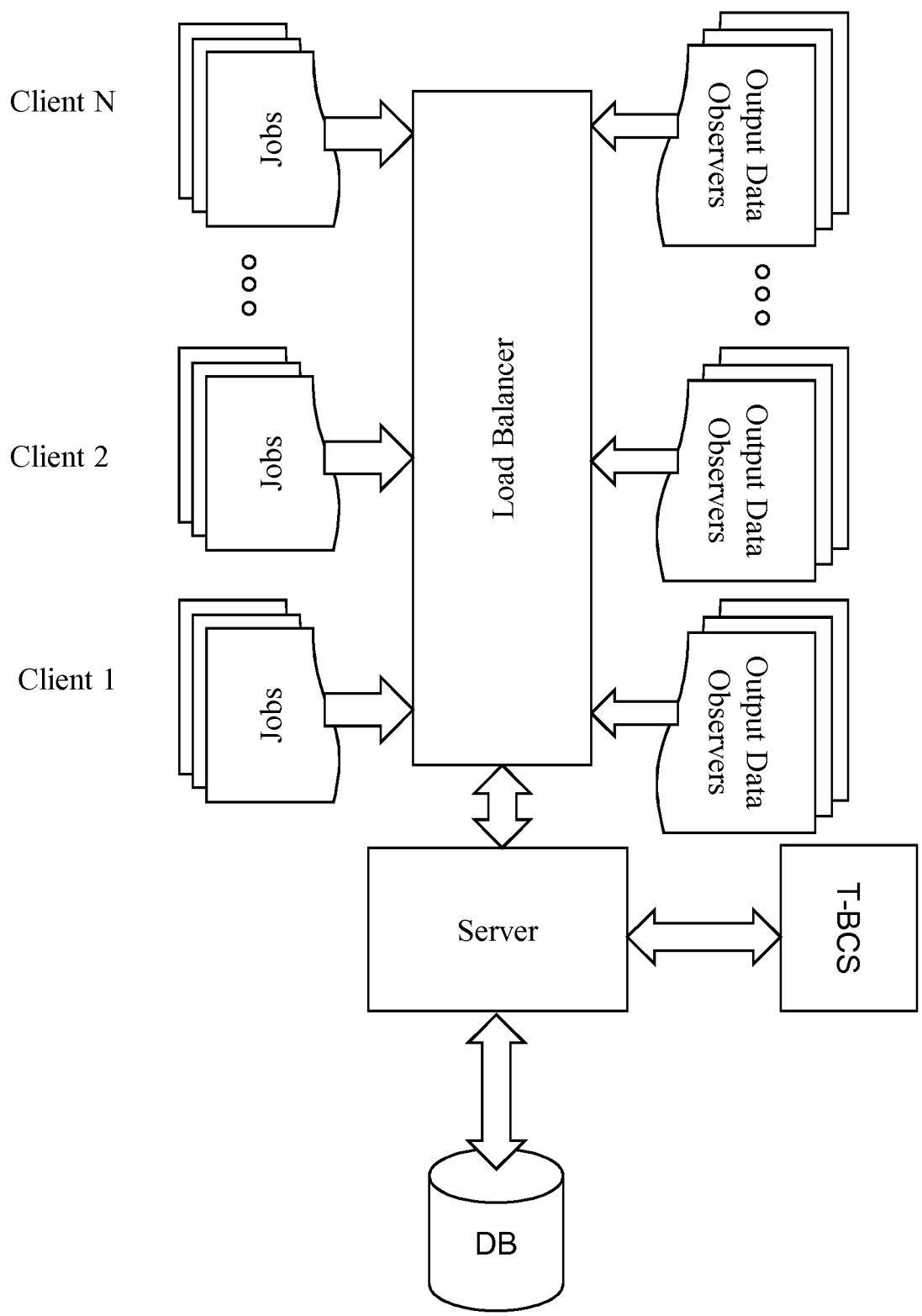

FIG. 15 further depicts a generic architecture with load balancing for serving multiple clients from the same T-BCS server host.

Figure 16:
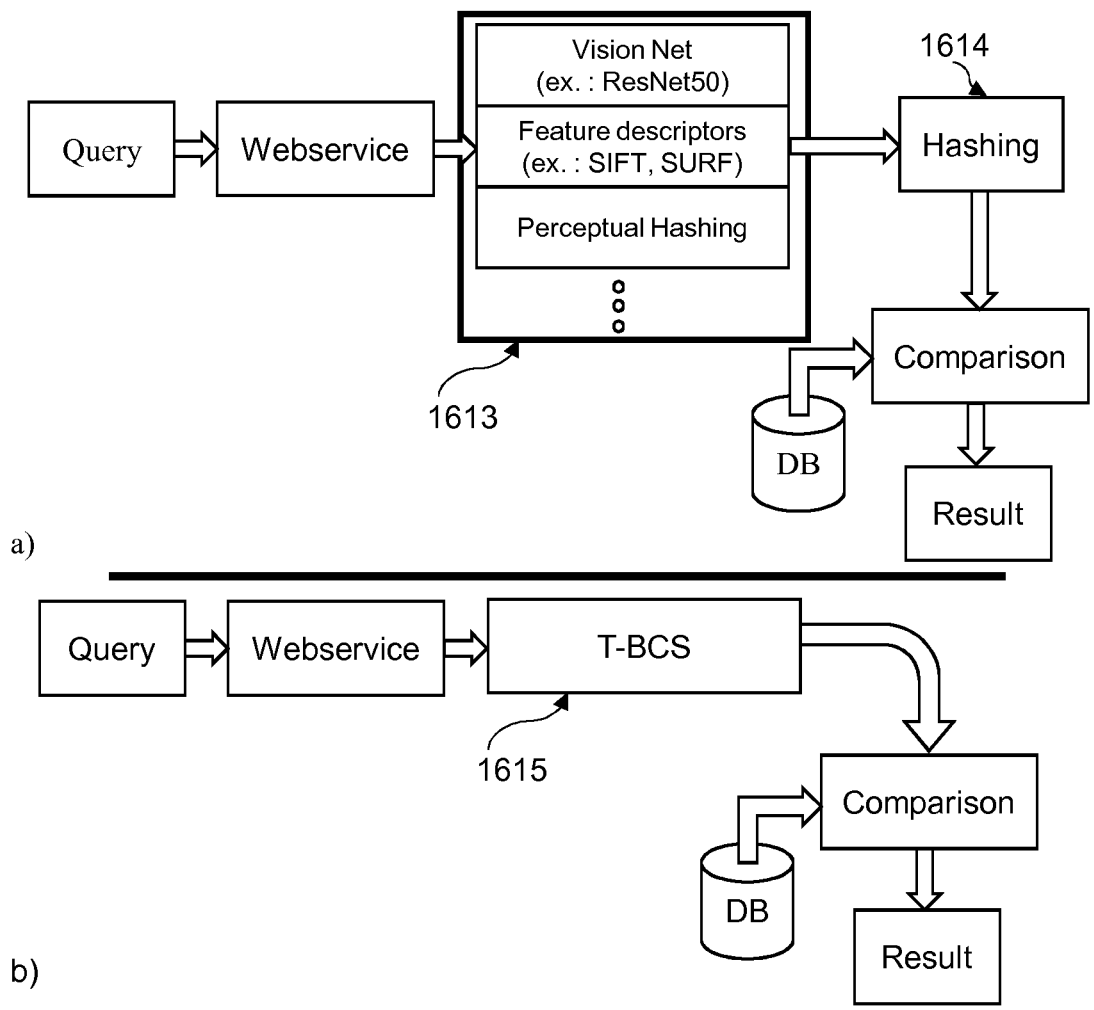

FIG. 16 compares a possible application of the proposed BNN server for image processing to a legacy application with a deep learning architecture.

Figure 17:
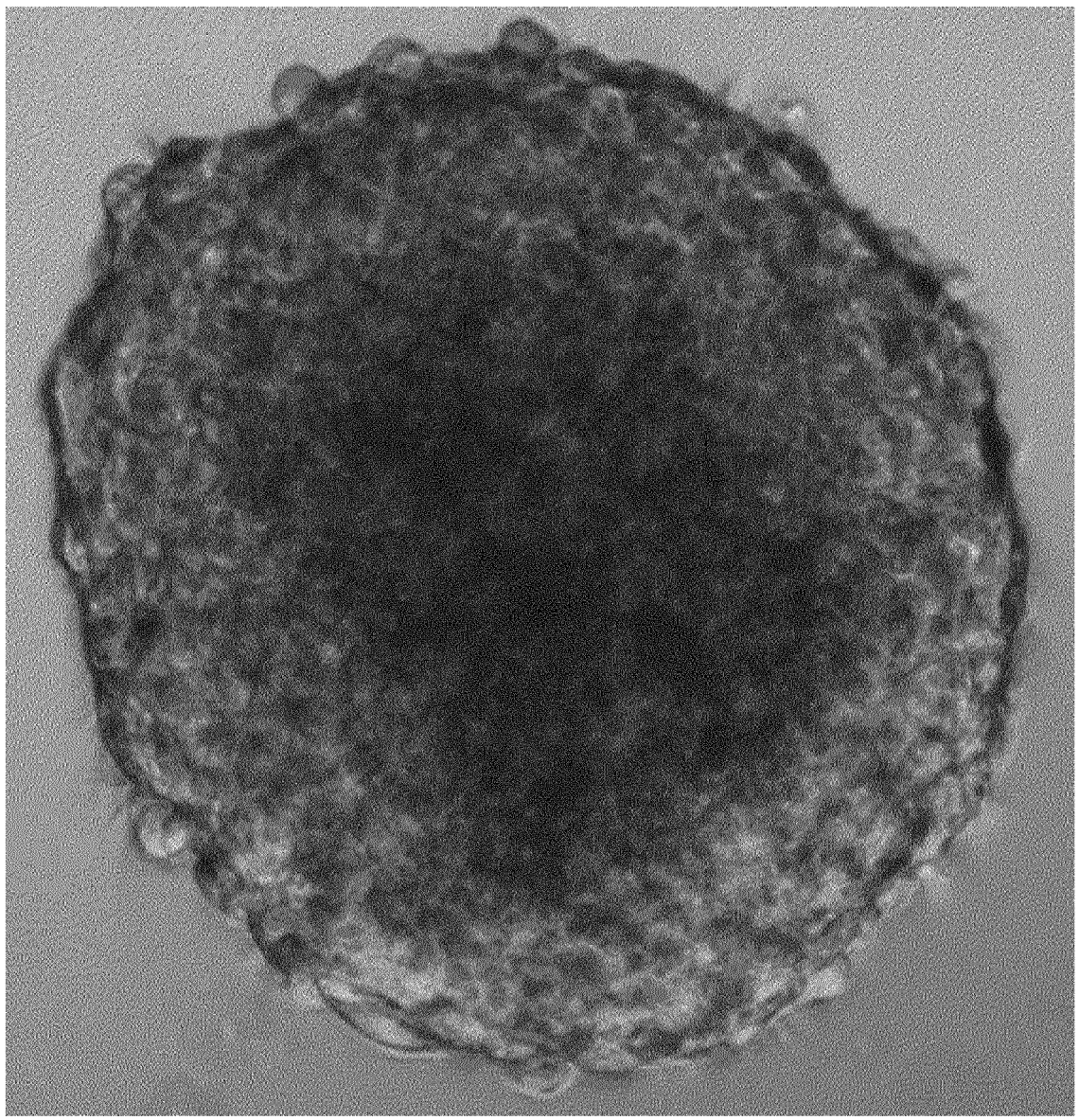

FIG. 17 shows a ~200 m wide neurosphere after 4 days of maturation of rat cortical stem cells.

Figure 18:
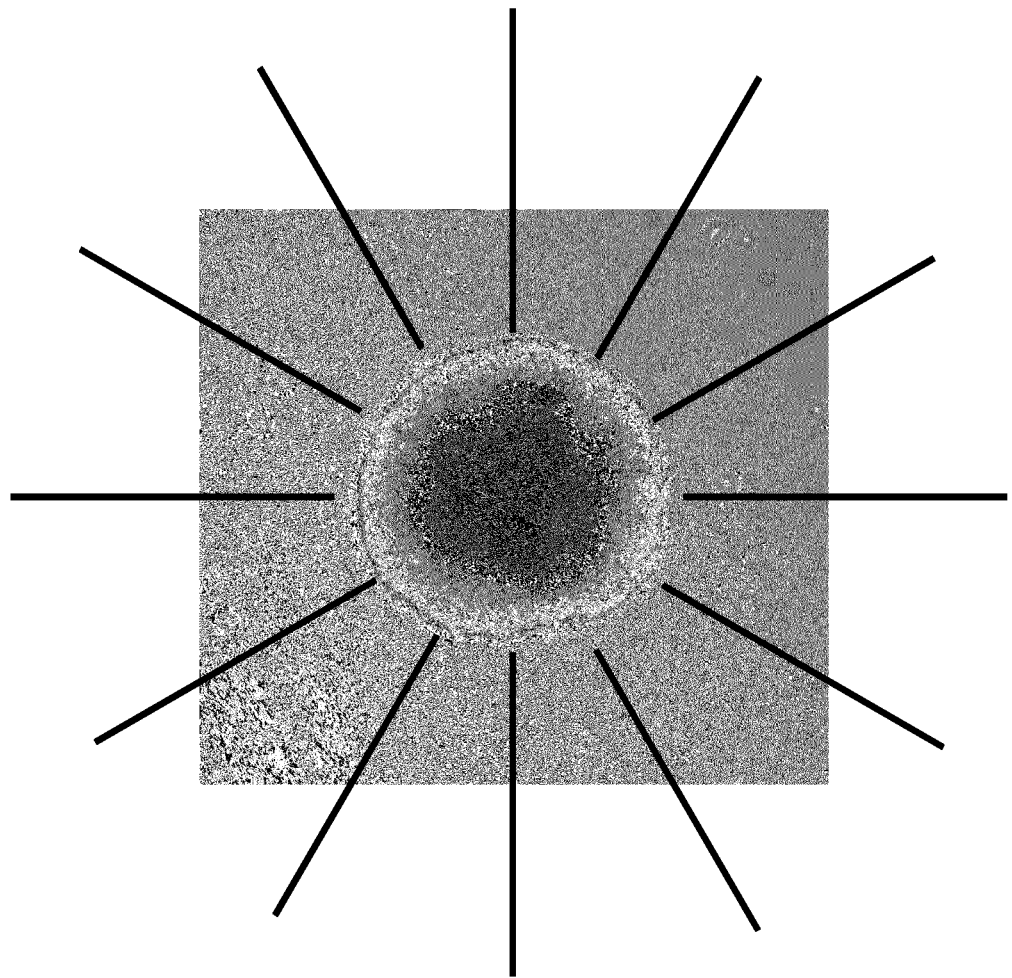
Figure 19:
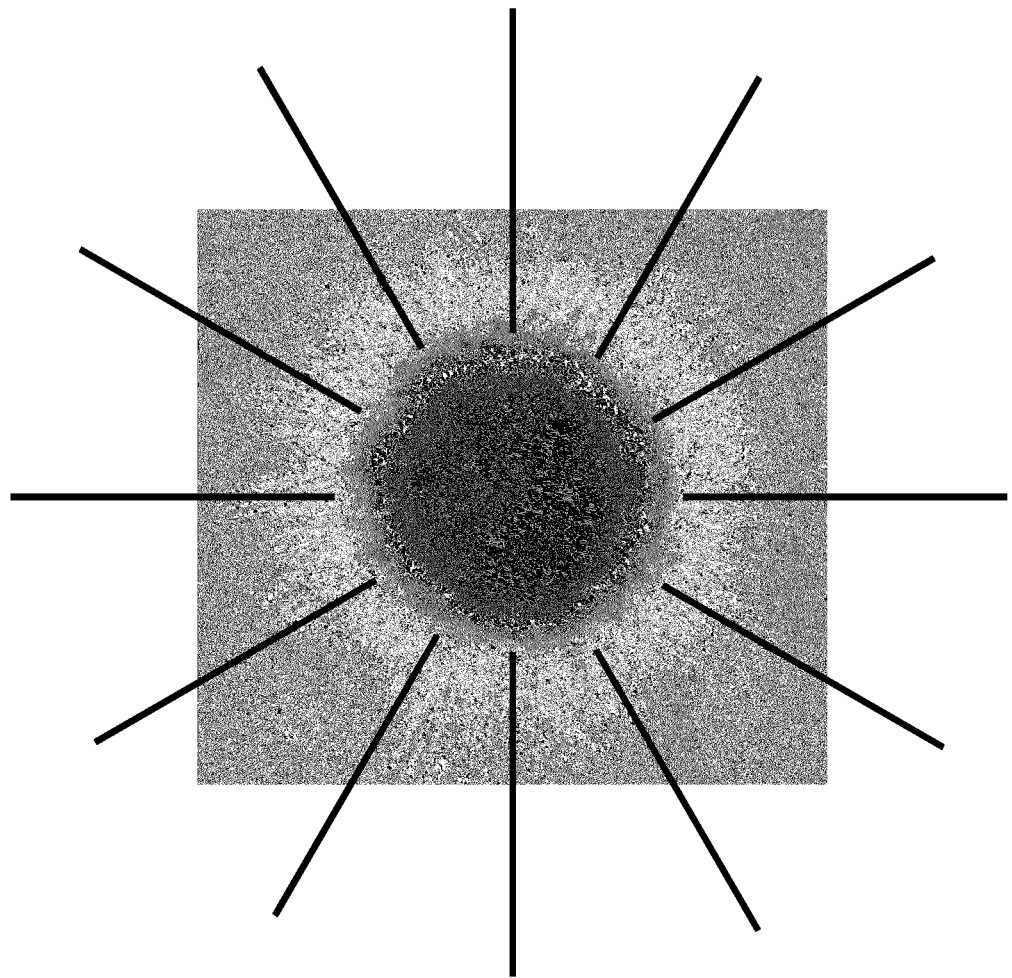
Figure 20:
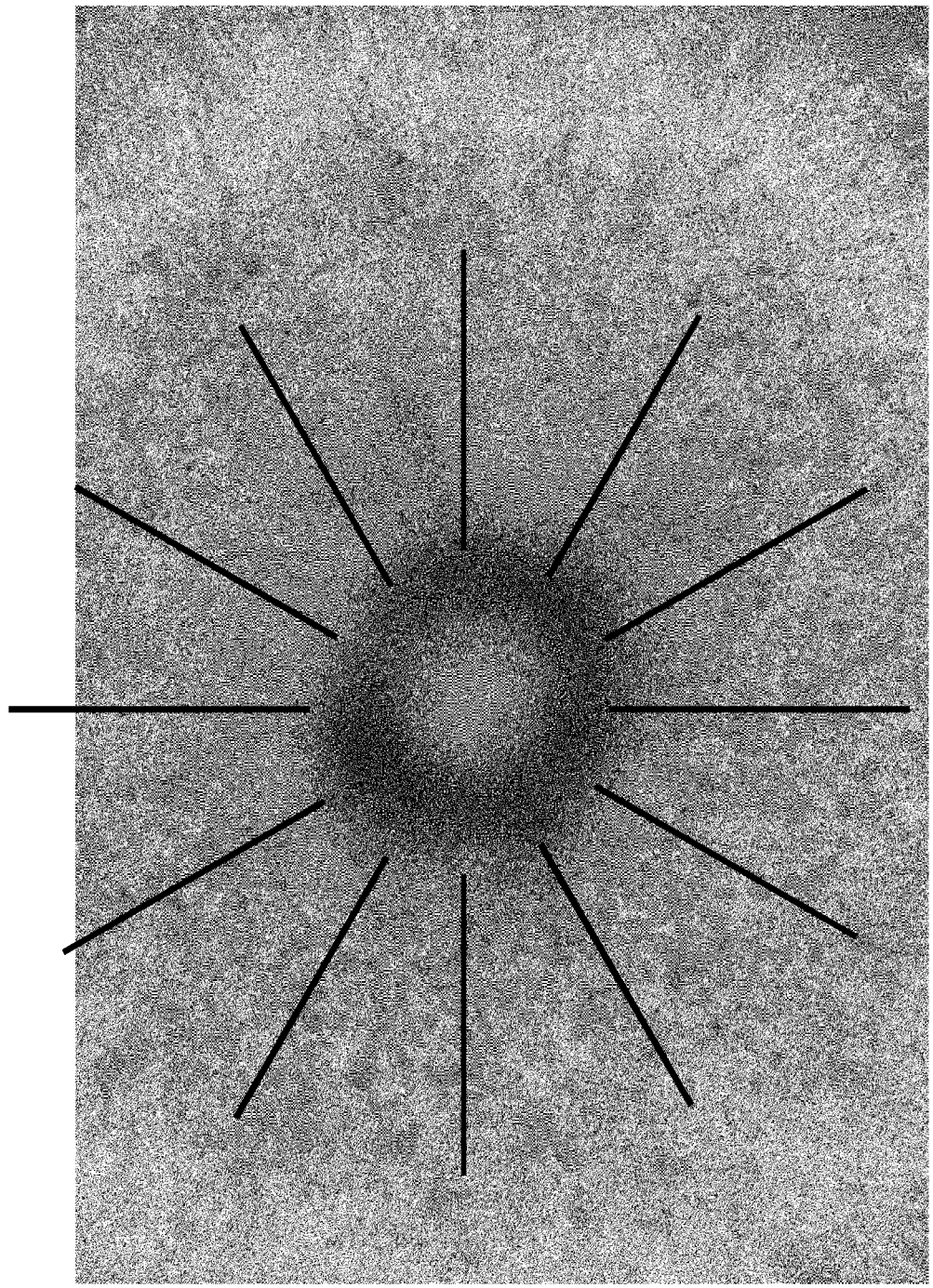

FIG. 18-19-20 schematically show an example of 12 electrodes regularly distributed along a virtual circumference of a neurosphere of cortical neural stem cells at three different growth stages.

Figure 21:
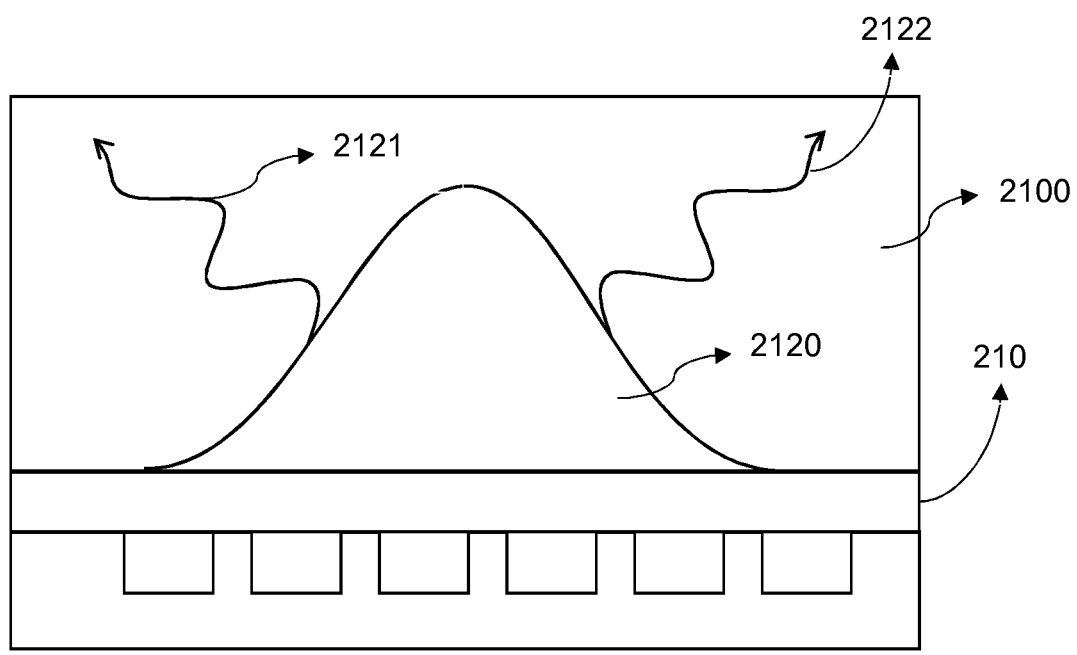

FIG. 21 illustrates stimulated 3D growth of neural cells directly on the MEA.

Figure 22:
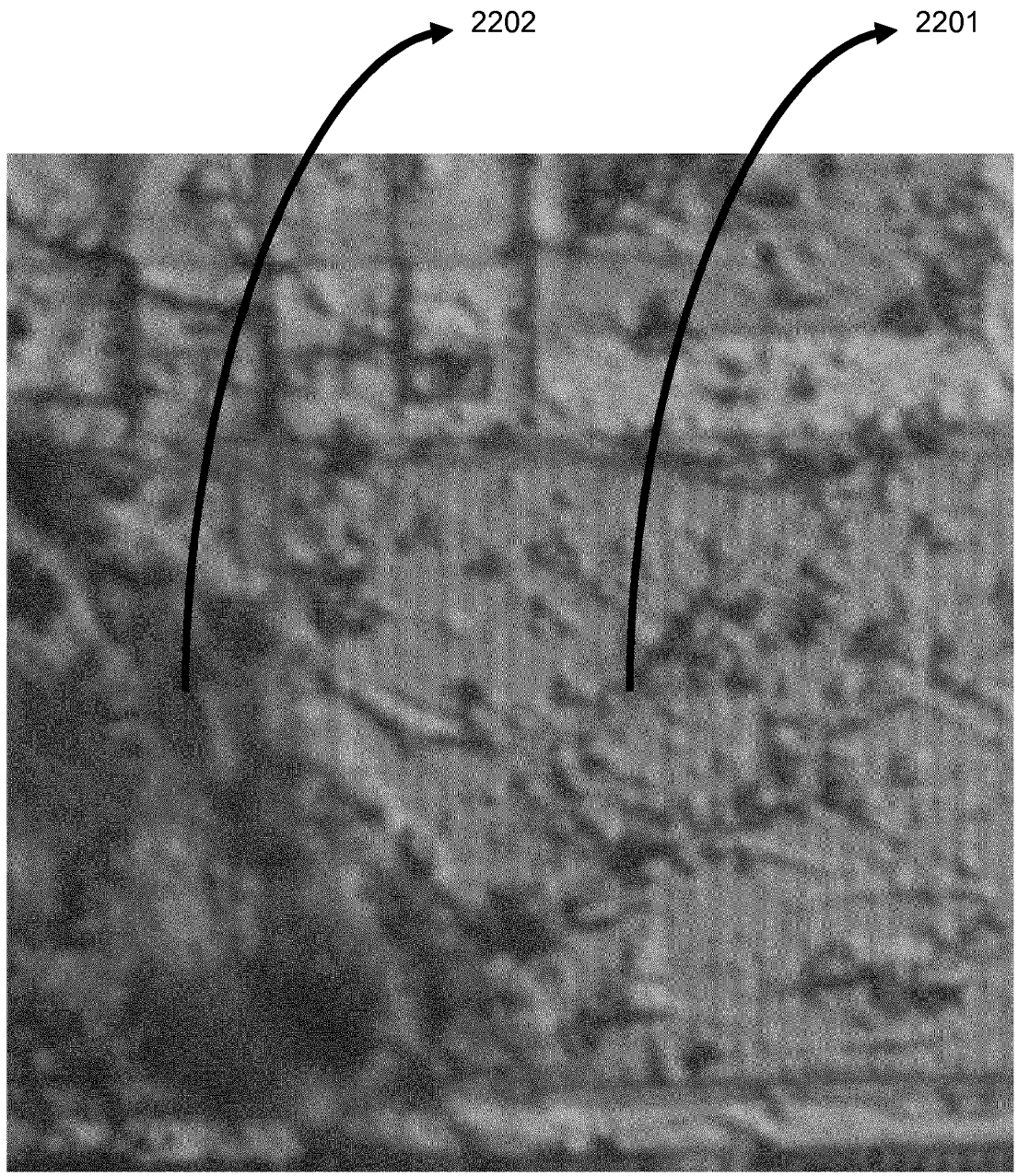

FIG. 22 shows a photograph of a biological neural network over an MEA circuit.

DETAILED DESCRIPTION

BNN Core Unit

Figure 1:
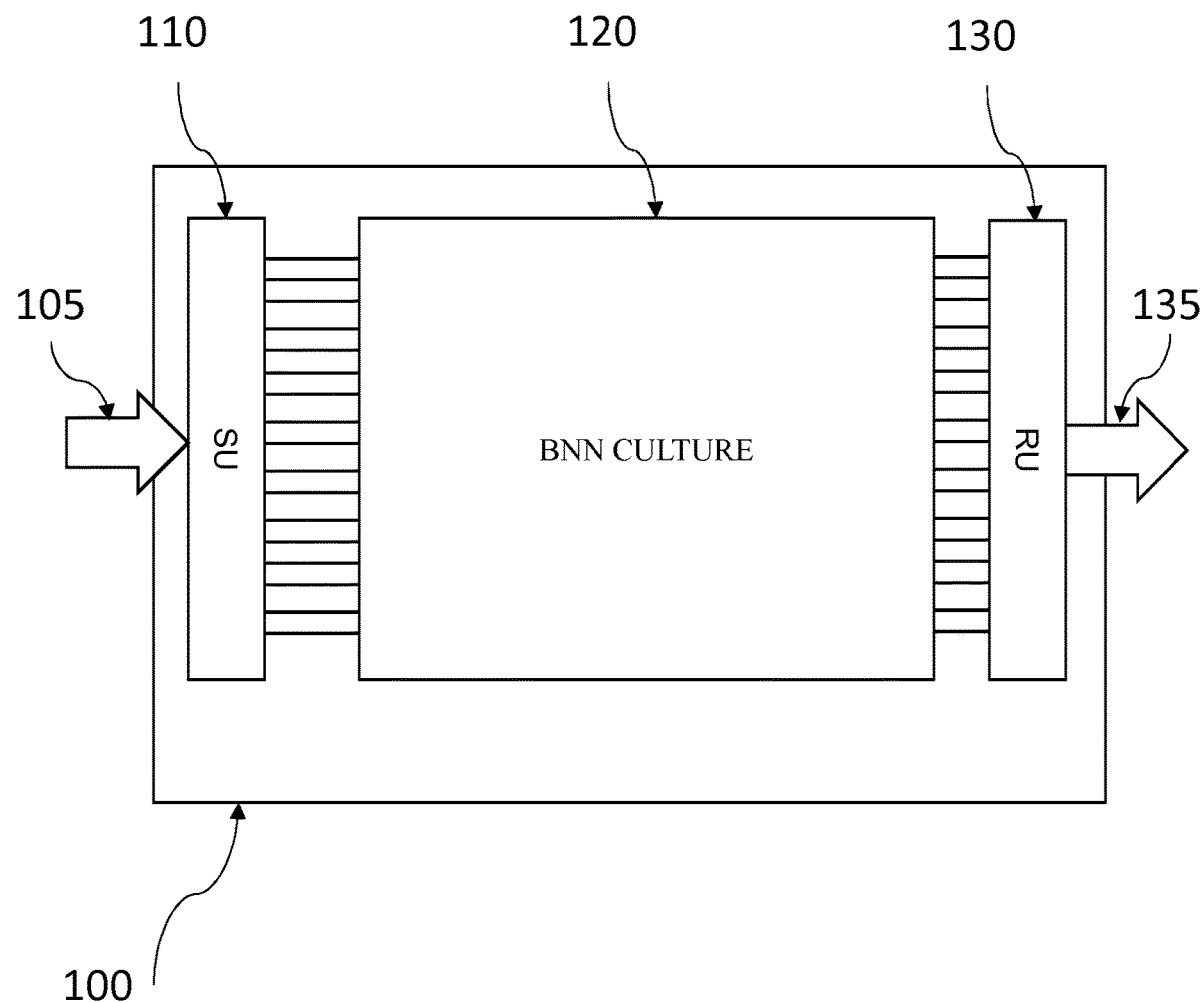

FIG. 1 depicts the core BNN unit 100 as a building block of a biological computing server. The biological material in the BNN unit is typically composed of, but is not limited to, an active biological culture 120, typically an assembly of a plurality of living neural and glial cells. The cells may be assembled through a variety of different processes, for instance, but not limited to, cell cultures or organogenesis like approaches. Throughout this disclosure, the terminology cell culture is used indifferently for in vitro cells growth and lifetime maintenance out of their natural in vivo environment. The BNN cells may be arranged in 2D or in 3D. The Stimulation Unit 110 (SU) represents the input interface between a digital data input signal 105 and the biological culture 120. It is used to selectively stimulate the different neurons, dendrites or axons. The Stimulation Unit 110 may control the digital data input signal transfer to the biological culture, by varying it spatially (addressing different neurons), temporally (stimulating with a variable signal over time), and/or spatio-temporally. Examples of realizations of the SU 110 include but are not limited to multi-electrodes arrays (MEA), patch-clamps, light induced stimulation such as optogenetics systems, magnetic or electric fields, ion stimulation, focused laser light, optical tweezers, or mechanically induced stimuli through gravity or pressure changes. The Readout Unit 130 represents the output interface between the biological culture 120 and a digital data output signal 135. It is used to selectively measure the activity of different neurons, dendrites or axons. The Readout Unit 130 may control the biological culture activity conversion to a digital data output signal, possibly multidimensional, by sampling it spatially (capturing the individual activity of different neurons), temporally (capturing a variable signal over time), and/or spatio-temporally. Examples of realizations of the RU 130 include but are not limited to multi-electrodes arrays (MEA), patch-clamps, imaging systems, ion sensitive sensors, electrical or magnetic sensitive sensors, chemical sensors, and other sensors suitable to neuron cultures.

A subset of the neurons may be excited with an input signal through a BNN input interface such as the electrical signals of a multielectrode array (MEA). Alternately, a subset of the neurons may be genetically modified to receive optical stimulation as an input signal from an optogenetic system. The electrical activity of the neuron cells may be monitored at several places in the biological material, as the outputs of the BNN unit, using measurement systems such as a multielectrode array (MEA) receiving an electrical signal. Alternately, a subset of the neurons may be genetically modified to express fluorescence as an output signal from the BNN to an imaging sensor system. However, there exists numerous other systems enabling or facilitating interfacing a BNN, for instance processes exploiting concepts similar to those in the human body, such as conversion of electrochemical stimuli into mechanical movement and observable in muscle movement or speech.

In a possible embodiment, the MaxOne MEA from Maxwell Biosystems (https://www.mxwbio.com) may be used as the host platform for the BNN core unit 100. The dissociated cell culture BNN 120 may be plated and grown on the MaxOne micro-sensors in CMOS technology according to the protocol as proposed from https://www.mxwbio.com/applications/neuronal-networks/applications/neuronal-networks/:

Sample Cell Culture Plating Procedure

Pre-coat the electrode array surface with a thin layer of poly(ethyleneimine) (PEI) (Sigma, Missouri, USA), 0.05% by weight in borate buffer (Chemie Brunschwig, Basel, Switzerland) at 8.5 pH.

Apply a 10 l drop of 0.02 mg/ml laminin (Sigma) in Neurobasal medium (Invitrogen, California, USA) for cell adhesion.

Seed cell suspension in a 6—l drop over the array.

Add 1 ml of a plating medium after 20-30 minutes.

After 24 hours, change the plating medium to a 1-2 ml of growth medium, and maintain the cultures inside an incubator to control environmental conditions (37° C., 65% humidity, 5% CO2)

Replace 50% of the growth medium twice per week.

In the proposed protocol by Maxwell Biosystems, the plating medium may consist of 850 ml of Neurobasal, supplemented with 10% horse serum (HyClone, Utah, USA), 0.5 mM GlutaMAX (Invitrogen, California, USA) and 2% B27 (Invitrogen, California, USA), but as will be apparent to those skilled in the art of cell cultures, other formulations are also possible.

In the proposed protocol by Maxwell Biosystems, the growth medium may consist of 850 ml of DMEM (Invitrogen, California, USA), supplemented with 10% horse serum, 0.5 mM GlutaMAX and 1 mM sodium pyruvate (Invitrogen, California, USA), but as will be apparent to those skilled in the art of cell cultures, other formulations are also possible.

In a possible embodiment, the Maxwell MEA micro-sensors may operate as the Stimulation Unit 110. They enable to stimulate from input digital data patterns the BNN activity using a subset of active stimulation electrode sites. The input digital data patterns 105 may be then be prepared by various data processing methods and software. In a possible embodiment the Maxwell Stimulation Module may be used as the SU 110 to provide 32 stimulation channels. Each stimulation channel may deliver up to ±1.6 V voltage or ±1.5 mA current amplitude, at an amplitude resolution of 2 nA and a time resolution of 2 s. The MaxLab Live software component may generate various digital data stimulation patterns suitable for these resolutions, such as monophasic, biphasic, triphasic pulses, ramp waveforms, and other custom pulse shapes.

In a possible embodiment, the Maxwell MEA microsensors may operate as the Reading Unit 130. They enable to output as digital data readouts the BNN activity which can be simultaneously recorded using multiple active electrode sites over configurable time scales ranging from microseconds to months. The digital data readouts 135 may be then be processed by various signal processing methods. The readouts may also be visualized in an imaging system for instance as a raster plot. While the current Maxwell Biosystems MEA technology embeds as a 2D plating a high-resolution CMOS-based microelectrode array featuring 1,024 low-noise readout channels, 26,400 electrodes at a density of 3,265 electrodes per mm2, including on-chip 10 bit ADCs and consuming only 75 mW as described by Ballini et al. in *A 1024-Channel CMOS Microelectrode Array With 26,400 Electrodes for Recording and Stimulation of Electrogenic Cells In Vitro*, IEEE Journal of Solid-State Circuits, vol. 49, no. 11, pp. 2705-2719, 2014, other arrangements may also be possible.

While the above possible embodiments have been described with the Maxwell Biosystems MEA solutions as an exemplary realization of a core BNN unit with high density and high throughput based on recent technology advances, it will be apparent to those skilled in the art that other neurotechnology, electrophysiology and/or optogenetics systems, circuits, devices, probes, components, software, protocols and methods may be employed as well individually or in combination with each other to provide a functional core BNN unit 100, for instance those developed by Multichannel Systems, a division of Harvard Bioscience Inc. (www.multichannelsystems.com), by 3Brain (www.3brain.com), by NeuroNexus, a subsidiary of Nuvectra (www.neuronexus.com), by Axion Biosystems (https://www.axionbiosystems.com/), by Charles River Laboratries (www.criver.com), by Plexon (www.plexon.com), by Koniku (www.koniku.com), by the Potter Lab at Georgia Tech (https:/sites.google.com/site/neurorighter/), the mesh electronics for single-neuron level chronic recording by the Lieber lab at Harvard University (http://cml.harvard.edu), and others.

As will be apparent to those skilled in the art, different types of neuronal cells may be employed as the biological basis for the BNN 120. In addition, the biological basis may of course contain single neural cell types, or a predefined combination of different neural cell types and even other cells. Moreover, the cell type composition may vary throughout the 2D or 3D structure of the BNN 120. In a possible embodiment, rat fetal neural stem cells (NSCs) such as those provided by Invitrogen, Catalog nos. N7744-100, N7744-200, the Gibco® cell lines from ThermoFisher Scientific, or others, may be employed. In an alternated embodiment, human neural stem cells (hmNPCs) may be employed such as the Lonza Poietics™ Neural Progenitor Cells (NHNP), the MiliporeSigma ReNcell®VM or ReNcell®CX. the ThermoFisher Scientific StemPro™ neural stem cells, and others. The neuronal cells may be maintained in vitro with a biological medium such as for instance MEM (Modified Eagle Medium Gibco) or DMEM (Dulbecco's modified Eagle's medium—Gibco, Invitrogen, ThermoFisher).

In a possible embodiment, the BNN 120 may employ a neurosphere or neurovolume system, an adherent monolayer system or other dedicated arrangements and constructs for fixing BNN cells and/or other cells, such as neural stem cells (NSCs). As will be apparent to those skilled in the art of biomaterials, the BNN 120 may be arranged in 2D, or preferably in 3D with various scaffold types to provide a proper living environment for the cells. This includes, but is not limited to, processes of growing for instance into a brain organoid or just maintain the living cell positions. The resulting in vitro brain organoid may then operate in a sustainable way as similar as possible as in a mammal brain environment. Examples of state-of-the-art scaffold formats and materials, such as hydrogels, that can be employed for the 3D culture and differentiation of a diversity of rat, mouse and human neural cells are listed in Table 1 of *Scaffolds for 3D in vitro culture of neural lineage cells*, A. Murphy et al. Acta Biomaterialia 54 (2017) 1-20. Hybrid hydrogels may also be employed such as the ones recently described in *Evaluation of RGD functionalization in hybrid hydrogels as 3D neural stem cell culture systems*, Mauri et al., Biomater Sci, 2018 February 27; 6(3):501-510. Commercial hydrogel scaffolds from Corning, Lonza, Qgel, Ibidi and others may also be employed. In further embodiments, the scaffolds themselves may also be constructed with biological material which enables them to grow as the neural stem cells duplicate and differentiate.

Figure 2A:
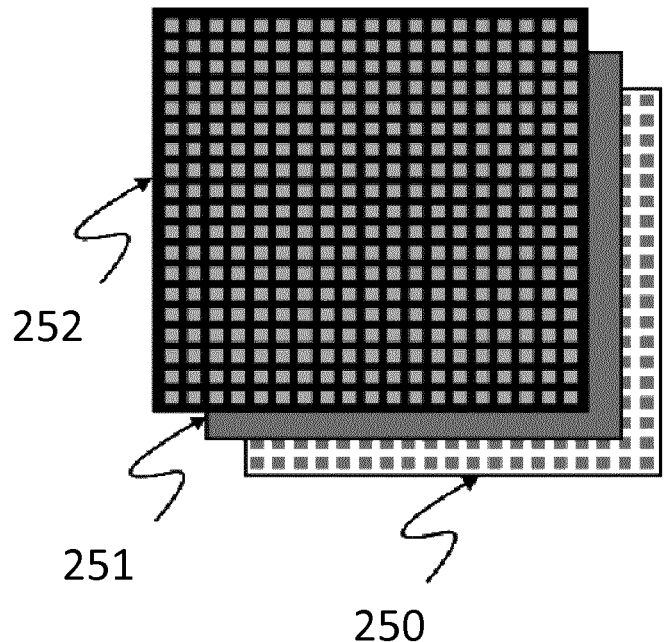

The bio-compatible material may also be specifically adapted to the microelectronic components of the stimulation unit SU 110 and/or the readout unit RU 130. As a possible embodiment, FIG. 2a) presents a possible application of mask etching in order to create a bio-compatible layer 251 that closely matches the underlying multi-electrodes array structure 250. Indeed, without precise positioning, a read-out or stimulation electrode is reading/injecting signal to several neurons at the same time. Etching using a mask 252 opposite to the MEA array structure 250 may be used in order to create a biological layer 251 that induces neurons positioning at more precise locations, by aligning the bio-compatible material 251 with the underlying MEA 250 so that the stimulation unit 110 may stimulate the BNN 120 at the neuron level and/or the readout unit 130 may read the BNN 120 at the neuron level.

Figure 2B:
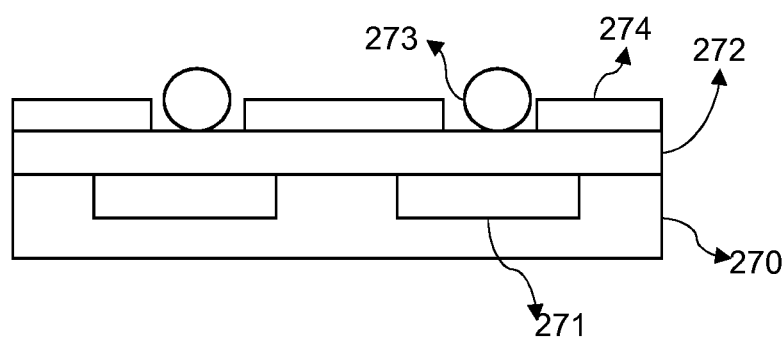

In a possible embodiment, an adherence layer may be coated specifically at locations where the RU sensors and/or the SU probes are located, so that the neural cells preferably stick and/or grow onto those areas, thus facilitating their control through the RU and SU interfaces. As a possible alternate embodiment, FIG. 2b) shows a schematic view of a BNN core unit assembly support 270 adapted for ensuring maximum efficiency of communication of the RU and SU interfaces with the neural cells. The RU and SU interface locations 271 may be coated with an adherence layer 272 in a conventional approach, and an additional layer 274 with masking properties may be further deposited out of the RU and SU interface locations, in order to prevent the cells 273 to adhere and develop out of the RU and SU interface control. The interface layers may also consist of special membranes allowing for optimal adherence and exchange of molecules and atoms for different purposes, including for instance a Matrigel® matrix or any similar material simulating the growth and connectivity.

Figure 2C:
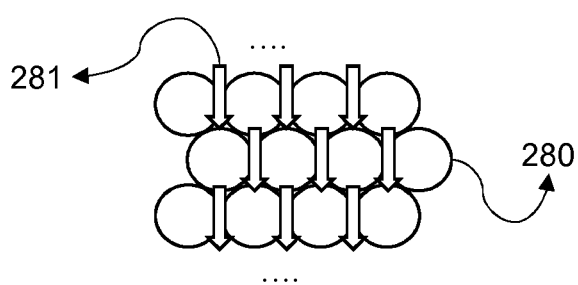

FIG. 2c) shows a side view of a possible embodiment of a 3D layered stack of neurospheres 280. Nutrient and additive liquid solutions useful to the BNN culture growth and maintenance may optimally flow throughout the neurosphere stack joints. The flow may be facilitated and controlled by various means, such as natural gravity, centrifugation, electrical or magnetic forces, and/or pumping.

Figure 2D:
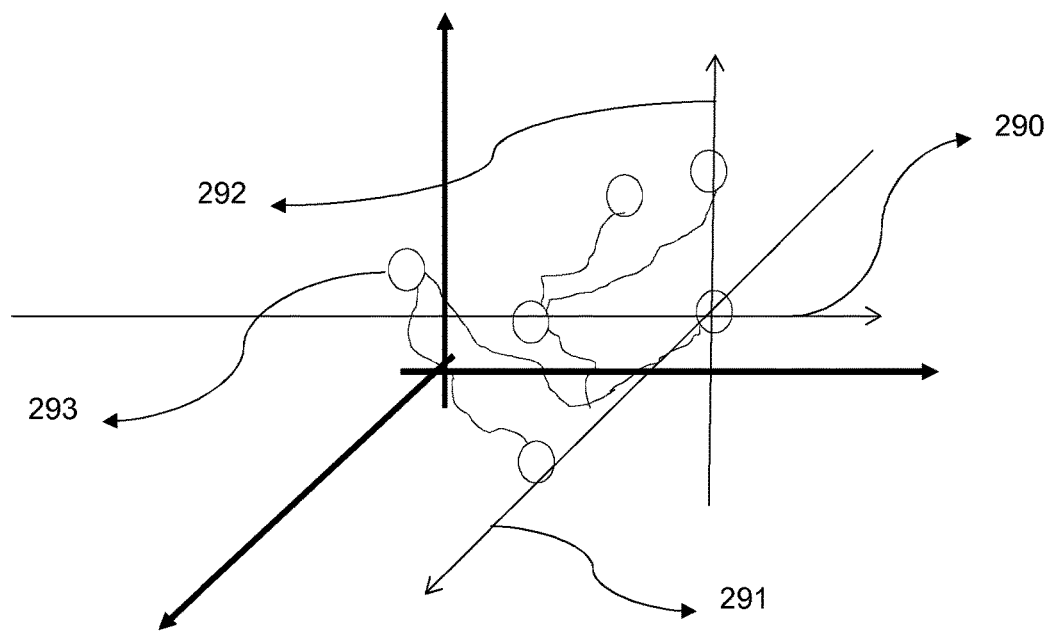

FIG. 2d) illustrates a possible embodiment of an optogenetics stimulation unit SU interface for generating spikes on genetically modified photosensitive neurons 293. Several light beams 290, 291 and 292 may be targeted on the same neuron, in a way that all beams cross at the location of the neural cell 293, which in turn generates a spike. This method enables to generate spikes in 3D conglomerates of neural cells. Let T, be the intensity threshold of the light stimulation above which an illuminated neuron spikes. The intensity values of the p beams $I_p$ may then be defined such that sum($I_p$) T, even if the individual intensity of each beam is lower than the spiking threshold $I_p$<T. As will be apparent to those skilled in the art of optogenetics, various lighting means may be used in accordance with the genetically modified photosensitive neural cells characteristics. In a possible embodiment, lasers for optogenetics may be used as the lighting beams. In order to excite a specific neuron lying at a given depth inside a 3D agglomerate of neurons, a laser (or multispectral) beam may be focused in order to reach the maximum energy of light exactly at the neuron depth location. The targeted position can further be adjusted by either changing the location of the light emitting device and/or by adjusting orientation of mirrors used to deflect the beam direction.

Figure 2E:
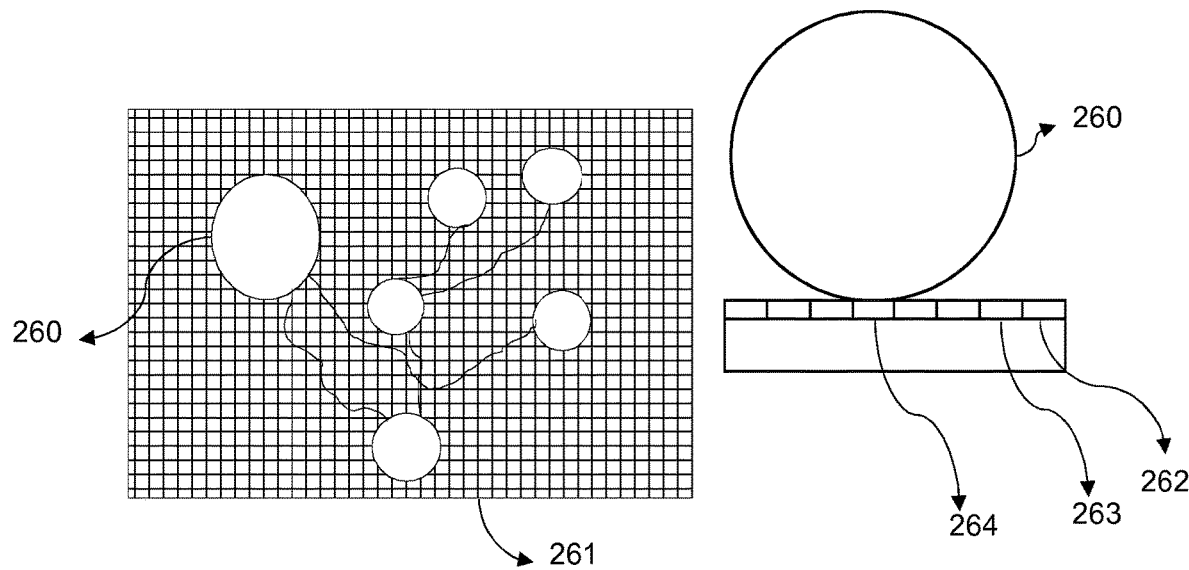

As a possible alternate embodiment, FIG. 2e) illustrates an alternative embodiment where the neurons 260 are deposited onto a digital display support 261. The digital display support may be for instance an LCD screen or an OLED screen. Current display technologies such as the screens developed for the smartphone industry typically employ pixel sizes of order of magnitude of a few tens of m. Moreover, other technologies like LCoS (Liquid Crystal on Silicon), DLP or DMD micro-mirrors approaches are below 5 um, whereas a neuron size ranges from 4 to 100 m, so it is possible to selectively control a pixel lighting either outside 262 of the neuron, at the frontier 263 of the neuron, or in line 264 with the neuron. Moreover, the color pixel can be chosen to obtain specific effect on the neuron activity in accordance with the genetically modified photosensitive neural cell characteristics.

Automated BNN Manufacturing, Growth and Maintenance

In order to develop a high-level cognitive ability, the BNN core unit needs to be maintained in a stable, sustainable and safe environment long enough to optimally grow and train its internal biological network in accordance with its biological needs, just as in vivo. As will be apparent to those skilled in the art of biotechnology, various automation systems have been developed for efficient biomanufacturing using well mastered cell lines in a number of biotechnology industry applications; but mammal neural cells are particularly fragile to handle in vitro out of their natural brain environment which is particularly well protected against potentially disturbing external factors such as mechanical strain or shocks, contamination from pathogens or chemicals, exposure to light radiation, etc. Another issue is that conventional cell line cultures typically operate at the cell level (the cell being the elementary factory component to produce certain proteins of interest, for instance) while for neural cells to be operative as a high-level cognitive functional system, they need to operate at a higher dimensional level, typically through interconnections in a multidimensional network. A further issue is that the human brain takes years to develop to express its high-level cognitive potential in vivo and there is no current research evidence that this process may be accelerated in vitro (Pasca, The rise of three-dimensional human brain cultures, Nature Vol. 553, January 2018).

There is therefore a need for dedicated biological neural network automation methods and systems to manufacture, maintain and control the neural cell cultures in sustainable and reproducible processes which can be automatically ran in parallel. The manufacturing processes comprise both the assembly of the BNN core unit elements and the growth of the BNN culture into a functional BNN core unit, including automated learning processes. The maintenance and control process comprise a diversity of activities such as feeding, stimulating, measuring as well as curing and cleaning. Possible embodiments of such automation methods and systems will now be described in further detail.

In order to scale-up the development of BNN core units beyond the current manual laboratory setup tasks, the manufacturing process may comprise an automated assembly of the BNN core unit elements. In a possible embodiment, 3D bioprinting of the neural cells together with the scaffold and the necessary elements to grow them may be employed. Examples of 3D biocompatible tissue engineering are the products developed by Sichuan Revotek Co., Ltd., Biosynsphere, Organovo, Aspect Biosystems, and others. In a possible embodiment, the BNN core unit assembly may employ stem cell derived neural progenitors, as described for instance by Joung et al. in 3D *printed stem-cell derived neural progenitors generate spinal cord scaffolds, Adv. Funct. Mater.* 2018. This may facilitate the optimal localization of the cells directly onto the scaffold. Clusters of cells in bioinks such as cell-laden hydrogels may be deposited in successive layers of channels at a resolution of about 200 m. As reported by the authors in their research on tissue models and future implants to treat spinal cord injuries, this method facilitates both the axon propagation and the maintenance of cell viability and mechanical stability in an in vitro CNS tissue construction process.

In order to automatically maintain a pre-assembled BNN core unit in operation beyond the current manual laboratory maintenance tasks, a second stage of the automation process may comprise an automated vascularization through microfluidic circuits to biologically feed the BNN core unit cells and collect their biological waste. Only limited solutions have been proposed so far for the in vitro vascularization of 3D brain organoids, so they remain limited in size due to central necrosis of the cells which can no longer be reached by peripheral nutrients after the organoid reaches a certain depth and density. Therefore, research biologists recently proposed to transplant them onto adult mouse brains (Mansour et al. *An in vivo model of functional and vascularized human brain organoids*, Nature Biotechnology, Vol. 36, No. 5, May 2018 and Lancaster, *Brain organoids get vascularized*, Nature Biotechnology, Vol. 36, No. 5, May 2018). The technical feasibility of vascularizing brain organoids with a patient s own endothelial cells was also recently demonstrated by Pham et al., *Generation of human vascularized brain organoids, NeuroReport*, Vol. 29, Issue 7, pp. 588-593, May 2018. However, the latter approaches are inherently limited to natural fluidics distribution and can only be controlled externally in a black-box manner, which restricts the automation capability to very simple models. In order to overcome this limitation of prior art BNN cultures, various possible alternate embodiments may be considered, either separately or in combination, as will now be described in further detail.

Figure 3:
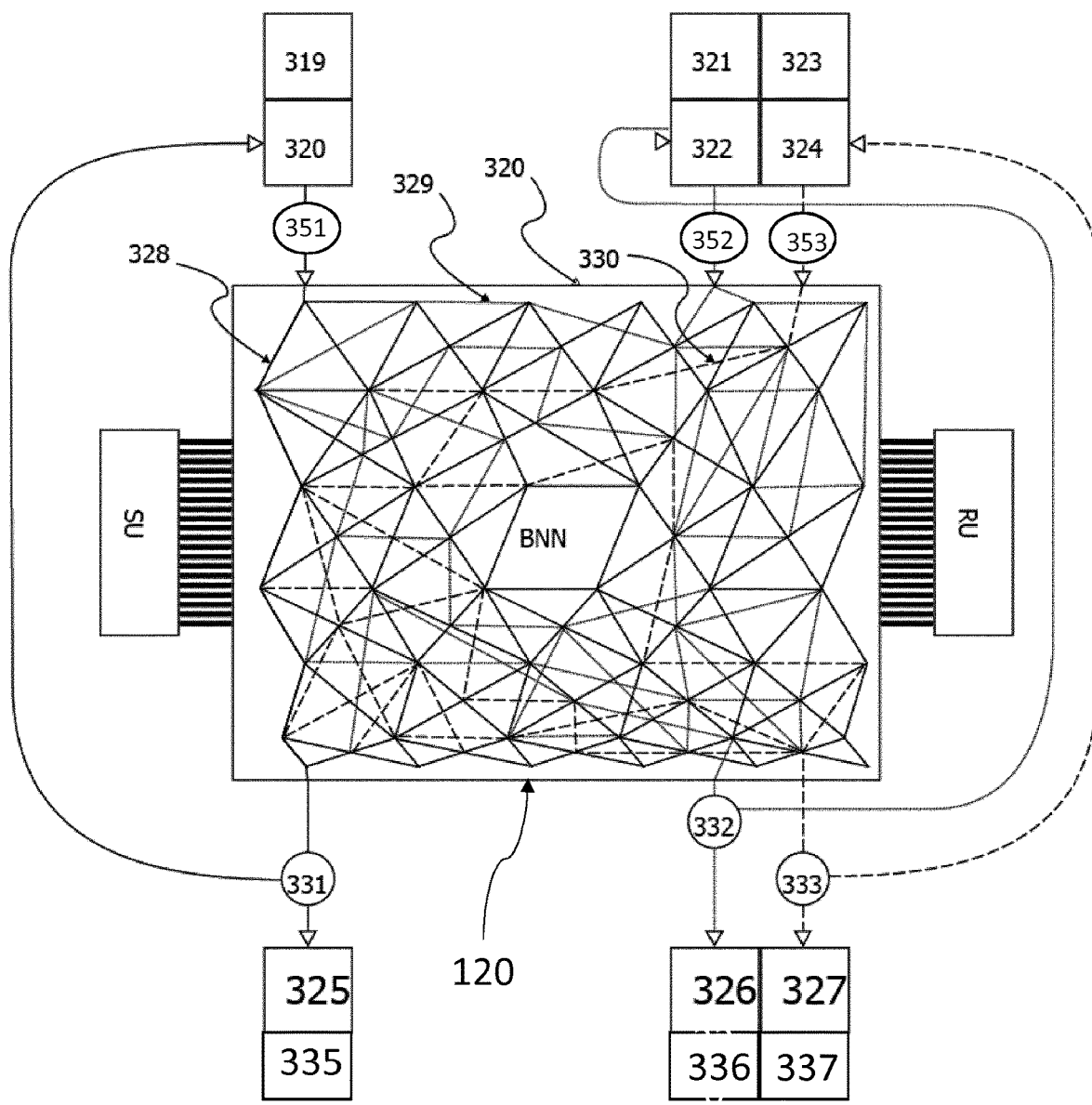
FIG. 3 depicts an exemplary schematic view of an automated vascularization system (AVS) operating with a BNN core unit.

FIG. 3 provides a schematic view of a first possible embodiment for an Automated Vascularization System (AVS) 300 operating with a BNN core unit 100, comprising:

one or more nutrient tanks 319 in connection with one or more nutrient dispensers 320 to inject one or more nutrients into the BNN culture 120. The nutrient dispenser 320 may comprise a mixer-injector active module in charge with delivering, with a mechanical device 351 such as a valve, an injector or a pump, the correct dosage of nutrients in accordance with the BNN culture specific nutrition needs.

- one or more additive tanks 321, 323 each in connection with one or more additive dispensers 322, 324 to inject one or more additives into the BNN culture 120. The additive dispensers 322, 324 may comprise a mixer-injector active module in charge with delivering, with a mechanical device 352,353 such as a valve, an injector or a pump, the correct dosage of additives in accordance with the BNN culture growth needs.
- one or more nutrient waste collectors 325, with a mechanical device 331 such as a valve, an injector or a pump, for filtering and expelling nutrient waste into a tank 335 and/or back into the BNN.
- one or more additive waste collectors 326, 327, with mechanical devices 332, 333 such as a valve, an injector or a pump for filtering and expelling additive waste into tanks 336, 337 and/or back into the BNN.
- one of more vascularization networks to connect the nutrient and additive dispensers 320, 322, 324 as well as the nutrient and additive waste collectors 325, 326, 327 to the BNN culture 120. The different vascularization flows can also be re-injected into the system to minimize loss.

Nutrients may comprise amino acids, carbohydrates, vitamins and minerals which may be in the same or in separate liquid solutions.

Additives may comprise chemicals, drugs or other elements, such as for instance a dopaminergic stimulation enhancer to increase the dopaminergic response of the BNN, a dopaminergic stimulation inhibitor to decrease the dopaminergic response of the BNN. As will be apparent to those skilled in the art of automation, this enables to reproduce and control a dopaminergic/anti-dopaminergic system. More generally, additives may comprise chemicals known to affect neurotransmitters in the central nervous system such as botox, nicotine, curare, amphetamine, cocaine, MDMA, strychnine, THC, caffeine, benzodiazepines, barbiturates, alcohol, opiates and others. Additive may also include growth factors, hormone and gazes (like $CO_2$, $O_2$, etc).

Each nutrient dispenser 320 is interconnected to the BNN culture 120 through a nutrient vascularization network 328 which conveys the nutrient to the BNN cells. Each additive dispenser 322, 324 is interconnected to the BNN culture 120 through an additive vascularization network 329, 330 which conveys the additive to the BNN cells. The nutrient vascularization network 328 and the additive vascularization networks 329, 330 may be the same or different networks.

Each nutrient waste collector is interconnected to the BNN cells 120 through a nutrient waste vascularization network which conveys the nutrient waste from the BNN cells. Each additive waste collector is interconnected to the BNN culture 120 through an additive waste vascularization network which conveys the additive waste from the BNN cells.

The nutrient waste vascularization network may be the same or a different network than the nutrient vascularization network 328. The additive waste vascularization networks may be the same or different networks than the additive vascularization networks 329, 330. The vascularization networks may be manufactured using 3D bioprinting using a biocompatible material, or grown from stem cells on the BNN 120 culture support.

Figure 4:
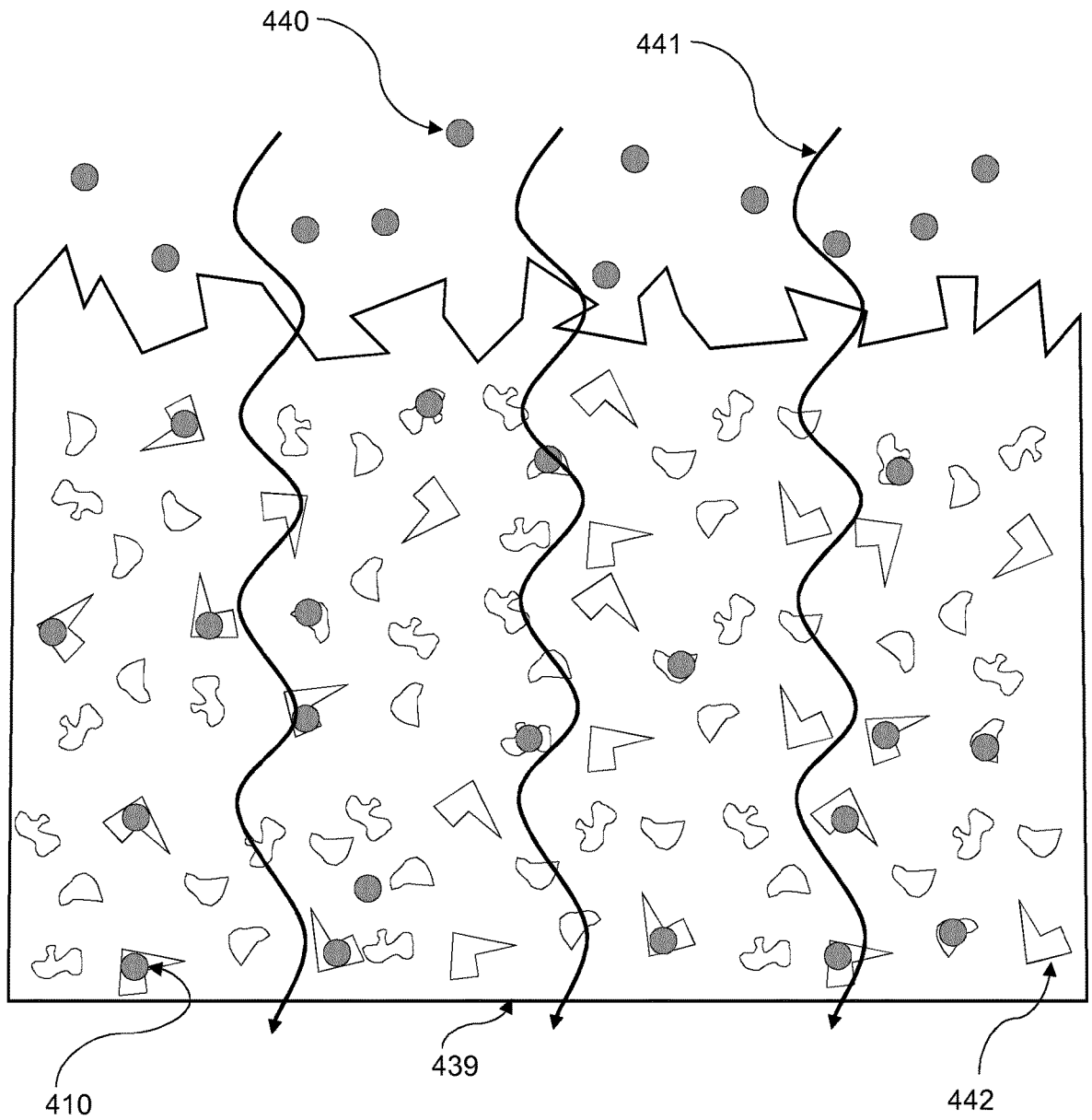
FIG. 4 and FIG. 5 show side cut views of two exemplary spongy structures as a possible host of neural cells with inherent vascularization network support to grow them in a 3D BNN culture.

It is pointed out that vascularization may be considered similar systems in the human brain or of a totally different type, such as structures of porous materials. FIG. 4 shows a side cut view of an exemplary embodiment of a spongy structure as a possible host of neural cells 440 with inherent vascularization network support to grow them in a 3D BNN 120. The spongy material 439 is preferably soft and compressible to mechanically host the BNN cells 440 in its pores 442 (as shown in 410) while later adjusting to their growth development as a 3D BNN culture. The spongy material 439 is further preferably porous and absorbent to convey the nutrients and/or the additives and/or the waste throughout the BNN culture. In a possible embodiment, a solution containing the neural cells 440 may be soaked into the spongy structure 439 so that the neural cells are regularly distributed throughout its pores and channels. In a possible embodiment, in order to enhance the adhesion factor, a Polyethylenimine (PEI) polymer may be used. In a further possible embodiment, neural stem cells 440 may be soaked from a solution containing a growth-factor such as the fibroplast growth factor FGF2 to prevent cell specialization until the stem cells are distributed into the spongy structure 439. Once the distributed cells have adhered the spongy structure 439, the BNN culture 120 is assembled, and the spongy structure 439 may be further used as its vascularization system. The adhesion and growth factor solution may be washed out and replaced with further nutrient and additive solutions 441 suitable for the specialization, growth and maintenance of the BNN culture cells. In an alternate embodiment (not represented), induced pluripotent stem cells may be mechanically inserted and cultured directly onto the spongy structure 339 as their inherent vascularization network system.

Figure 5:
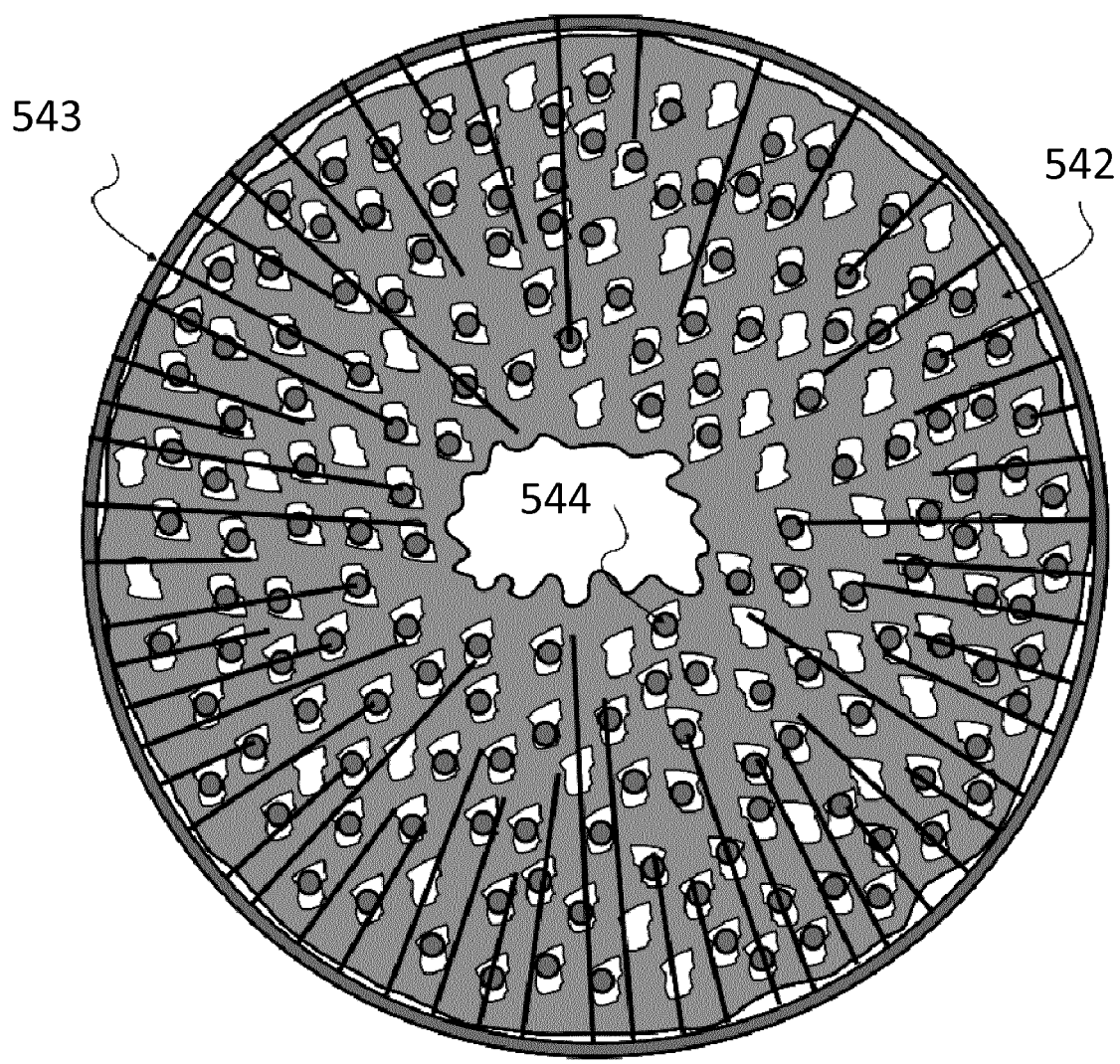

FIG. 5 shows a top cut view of another exemplary embodiment of a spongy structure as a possible host of neural cells 544 with inherent vascularization network support to grow them in a 3D BNN culture, while facilitating the interfacing of the electrical and/or optical components of a stimulation unit and/or a readout unit into the 3D BNN culture. To this end the spongy structure may be shaped as a sphere, with electrophysiology clamps or electrodes traversing the spongy structure from a diversity of placements distributed all around the sphere, and penetrating it at different depths.

In a further possible exemplary embodiment (not illustrated), the 3D BNN may be cultured in a sandwich-like structure, along biocompatible filaments suspended between two planes. The neural cells may be attached to the biocompatible filaments by various means. In a possible embodiment, the filaments may be coated with an adherence factor such as PEI, but other embodiments are also possible.

BNN Controller

Figure 6:
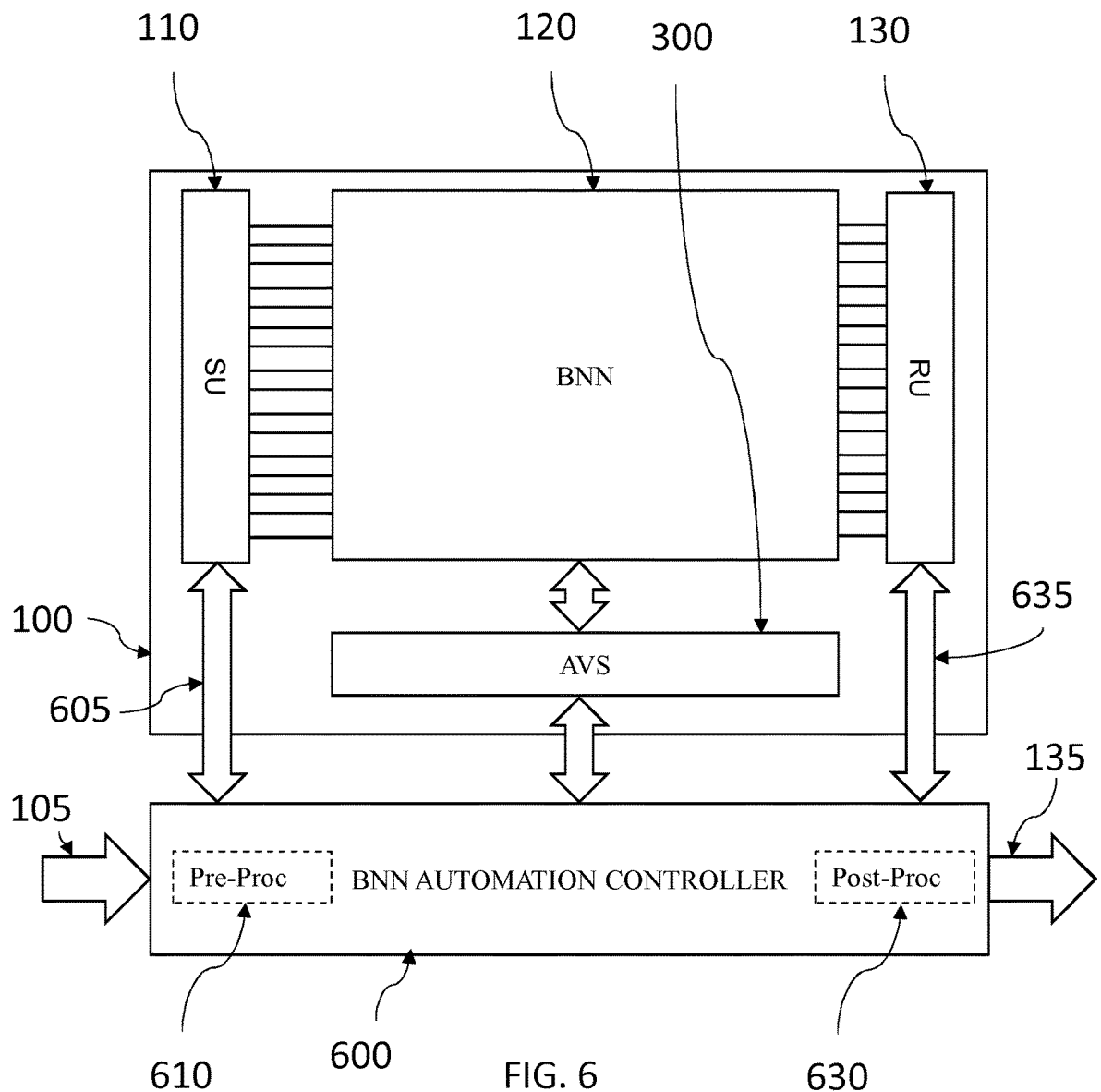
FIG. 6 shows a schematic view of a possible automated BNN growth, maintenance and control system.

FIG. 6 shows a schematic view of a possible automated BNN growth, maintenance and control system comprising the BNN core unit 120, stimulation module 110, readout module 130, and an automated vascularization system (AVS) 300 which may comprise the nutrient and additive tanks and dispensers as well as the waste collectors. In a preferred embodiment the operation of the AVS is orchestrated by a BNN automation controller 600 which is in charge with calculating in real time the choice and amount of nutrients and additives to be injected by the AVS into the BNN culture, as well as the amount of waste to be collected by the AVS from the BNN culture. The BNN automation controller may be a computer processor built with electronics hardware and adapted to execute software algorithms. In a simple embodiment, the BNN automation controller may operate in open loop, identifying and quantifying the necessary nutrients and additives and deriving the resulting waste values based on the knowledge from scientific expertise in neurophysiology parametrization. In a further embodiment, the BNN automation controller may further continuously monitor the readout information 635 from the BNN readout module 130 to determine the latest BNN culture status and may adjust accordingly the AVS parameters.

In a still further embodiment, the BNN automation controller may control the stimulation signals 605 for the stimulation unit to operate synchronously with the BNN status. For instance, the nutrients and additives to be injected by the AVS in the BNN culture medium as well as the waste to be collected differ according to the maturation stage of the BNN cells along their lifecycle: differentiation stage (assembly), growth stage (learning), operational stage (stable functionality) and death stage (extra waste generated). The ratio of nutrients or drugs that are re-injected or disposed may be controlled with the nutrient dispensers, the additive dispensers and their respective waste collectors. Through these feedback loops, the quantities of nutrients and drugs can be dynamically adapted to: 1/ optimize lifespan, 2/ minimize manual care, 3/ tune responsiveness and stabilize performance of the BNN. The homeostasis of the BNN may thus be maintained over time.

In a possible embodiment, the BNN automation controller 600 may directly feed the raw data input signals 105 as the stimulation signals 605. In an alternate embodiment, the BNN automation controller may further include a pre-processing unit 610 in charge with transforming the data input signals 105 into stimulation signals 605. This enables the BNN automation controller to better adapt the raw inputs to the actual stimulation unit SU capability and the BNN capability so that the end-to-end BNN processing task is optimally performed without the need for the end user to specifically adapt his/her input signals to each possible configuration. This also facilitates learning tasks, as the capability of the BNN may evolve over time so the signal pre-processing 610 may also be adapted accordingly.

In a possible embodiment, the BNN automation controller may directly output the raw BNN readouts signals 635 as the signals resulting from the end-to-end BNN system processing. In an alternate embodiment, the BNN automation controller 600 may further include a post-processing unit 630 in charge with transforming the raw BNN readouts signals 635 into output signals 135. This enables the BNN automation controller to better adapt the raw readouts, which may be too noisy to easily interpret, to the actual application needs. An exemplary application is the extraction of relevant signals out from a train of spikes with a spike sorting signal processing algorithm, but other approaches may be used, such as statistical models, classifiers, or even machine learning methods. This also facilitates learning tasks, as the end-to-end BNN system may be trained to associate a comprehensive target output signal 135 to a pre-defined input signal 105 without the need for the end user to specifically interpret the measured output signals according to each possible internal BNN biological culture or readout unit configuration. This also facilitates learning tasks, as the capability of the BNN may evolve over time so the signal post-processing 630 may also be adapted accordingly.

Figure 7:
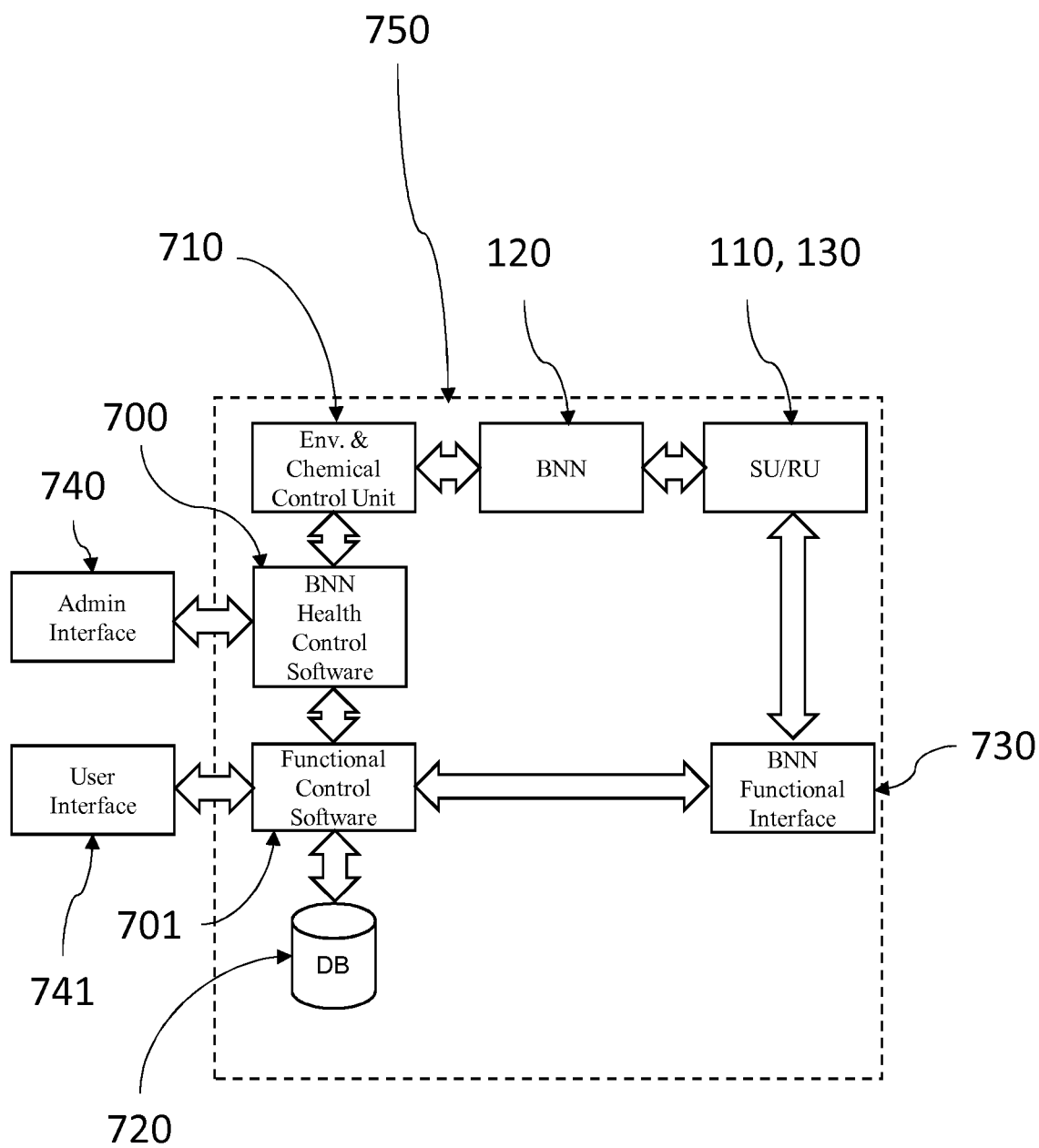
FIG. 7 shows another schematic view of a possible automated BNN growth, maintenance and control as a biological operating system (BOS).

FIG. 7 shows another schematic view of a possible automated BNN growth, maintenance and control as a Biological Operating System (BOS, by analogy with a computer Operating System). Such a BOS can host a real time functional control software for an end user to execute a BNN processing unit function by abstracting the BNN automation processes so that the end user does not notice them, similar to a conventional computer operating system or cloud computing service abstracting the underlying hardware specific devices and operations. The proposed BOS operates with the BNN core unit culture 120, the stimulation module and readout module SU/RU 110/130, and a BNN health control unit 710 for an automated vascularization system (AVS) as formerly described. The BNN health control unit 710 may comprise a chemical control unit with the nutrient and additive tanks and dispensers as well as the waste collectors, as well as an environmental control unit in charge with controlling other BNN culture environment parameters such as temperature, pressure, humidity, ratio of $O_2$ or $CO_2$, and other parameters. It may include for instance digitally controlled micro-pumps for the delivery of chemicals as well as temperature, hygrometry, pH or $CO_2$ sensors, or it may even change any other environmental parameters including for instance sound or light waves in any frequency band. The BNN health control unit is in charge with monitoring the health of the BNN cells under real time supervision by a BNN health control software 700. This health monitoring system thus operates as a homeostatic system which in charge of regulating the BNN performance through time, as it may naturally drift over time, transparently to the end user. It operates by adjusting the environmental parameters (chemicals, nutrients, temperature, $CO_2$, etc.) to ensure proper functionality of the BNN processing unit over time. This may include periodically checking that the SU input signals training set still results in the expected RU output signals. The BNN health control software 700 may be managed by a user administrator of the system through an administrator interface 740.

A real-time functional control software 701 is further in charge with managing the functionality of the BNN as a processing unit, through a BNN functional interface 730. The BNN interface 730 may be used for processing in real-time the input and the output of the BNN, which are interfaced using the SU/RU systems described previously. The BNN interface 730 may for instance apply any necessary stimulation signals pre-processing tasks (610) and/or readout signals post-processing tasks (630).

An end user may interact with the real time control software 701 by means of a user interface 741. The user interface 741 may be the same or different user interface for an end user and/or and an administrator user, but if they are the same, the administrator user has access to more functionality. Parameters for the real-time functional control software 701 as well as for the BNN health control software and/or the BNN functional interface may be stored in a database 720.

For high level cognitive BNN processing unit functionality possibly requiring very low latency and high data throughput bandwidth, the BNN functional interface 730 may apply further data pre-processing 610 and/or data post-processing algorithms 630 under control by the real time functional control software 701. In a possible embodiment, the real-time control software does not operate over the internet but in local. The functional control software 701 may thus be uploaded either by the administrator using the administrator interface 740, or directly by the end user using the user interface 741.

The BNN controller computer system (also "system" or automation system herein) may be programmed or otherwise configured to implement different BNN processing methods, such as receiving and/or combining stimulation input signals, processing them, and generating and/or combining readout output signals in accordance with a given application.

The BNN controller may be a computer system or part of a computer system including a central processing unit (CPU, "processor" or "computer processor" herein), memory such as RAM and storage units such as a hard disk, and communication interfaces to communicate with other computer systems through a communication network, for instance the internet or a local network. Examples of computing systems, environments, and/or configurations include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and the like. In some embodiments, the computer system may comprise one or more computer servers, which are operational with numerous other general purposes or special purpose computing systems and may enable distributed computing, such as cloud computing, for instance in a BNN data farm. In some embodiments, the BNN controller may be integrated into a massively parallel system.

The BNN controller system may be adapted in the general context of computer system-executable instructions, such as program modules, being executed by a computer system. Generally, program modules may include routines, programs, objects, components, logic, data structures, and so on that perform particular tasks or implement particular abstract data types. As is well known to those skilled in the art of computer programming, program modules may use native operating system and/or file system functions, standalone applications; browser or application plugins, applets, etc.; commercial or open source libraries and/or library tools as may be programmed in Python, Biopython, C/C++, or other programming languages; custom scripts, such as Perl or Bioperl scripts; and highly specialized languages suitable for linear genetic programming and cognitive computing, such as SlashA or machine code or any other data structure describing computation steps (like those used for Push Genetic Programming, Cartesian Genetic programming or Tree-based Genetic Programming).

Instructions may be executed in distributed cloud computing environments where tasks are performed by remote processing devices that are linked through a communications network. In a distributed cloud-computing environment, program modules may be located in both local and remote computer system storage media including memory storage devices.

The whole system may thus operate as a Biological Operating System 750, as it gathers all the systems required to ensure the operations of the BNN computing system.

In a possible embodiment, the BNN functional interface 730 may include various input and/or output signal processing algorithms such as pre-processing or post-processing filters, classifiers, machine learning algorithms based on mathematical or statistical models, and the functional control software 701 may control those algorithms as well as their parameters in accordance with the end user needs. Signal pre-processing may comprise transforming the signals to be learnt by the BNN so that they optimally fit the SU stimulation capability and formats. Signal post-processing may comprise transforming the signals output from the BNN into a more comprehensive format so that they provide the target functionality. In a possible embodiment the BNN may be modeled as a non-linear system and signal pre-processing may comprise applying a non-linear gain to the input signals. In a possible embodiment the BNN functional interface may include one or more artificial neural networks as pre-processors and/or post-processors and the parameters may comprise weight values, choice of activation functions, and other parameters to achieve the learning of the signals and/or their classification. For instance, pre-processors may be useful to repeat the input application signals over some period of time or to slightly vary them for more robust training and re-enforcement of the learning process.

In general, automation aims at producing a BNN processing system which generates the correct set of spatio-temporal output signals $O_i(t)$ for given spatio-temporal input signals $S_j(t)$ (i identifying the stimulating input electrode, j the sensing output electrode and t the sampling time). Typically, the BNN may be trained with a set of k different functions $\{O(t), S(t)\}(k)$ altogether called the training set where $O(t)$ and $S(t)$ respectively represent the vectors of components $O_i(t)$ and $S_i(t)$ respectively. After a successful training, the BNN can be used to predict correct outputs for inputs $S(t)$ which do not belong to the training set. Successful training as well as successful prediction may be measured as the minimization of the difference between the target signals $O(t)$ and the measured BNN output signals. Various metrics may be used to this end, such as for instance the Mean Square Error (MSE) or more generally a n-norm distance, such as the Euclidean distance or the 1-norm distance. Formally, that means that it is able to output the correct values for a set of p different functions $\{O(t), S(t)\}$ (p) altogether called the test set which do not belong to the training set.

In some embodiments, in order to achieve this successful training, machine learning algorithms (artificial neural networks ANN, convolutional neural networks CNN, support vector machines SVM and deep learning in particular, but this includes also any ML approaches like random forest, genetic algorithms, genetic programming, reservoir computing, etc.) may be used in order to present optimally the inputs and to measure optimally the outputs. For instance:

some of the k functions $\{O(t), S(t)\}(k)$ may need to be repeated more often than others;
some of the inputs may be mapped to different electrodes over time;
the simultaneous reading of several electrodes may be required;
etc.

More generally, raw signal inputs 135 may be fed into a first pre-processing subunit 610 of the BNN interface 730 that processes them before feeding them into the BNN 120 with the SU 110, while the BNN 120 output signals 635 readout from the RU 130 may themselves be further transformed by a second post-processing subunit 630 of the BNN interface 730 in order to produce more suitable output signals 135, depending on the application needs. In an open-loop architecture, the pre-processing subunit and the post-processing subunit may operate independently from each other. In a closed loop architecture, they may operate jointly, for instance some output from the post-processing unit may be fed back into the stimulation pre-processing unit.

Preferably, the pre-processing unit may perform a spatio-temporal processing of the raw inputs $S_r(t)$ in order to generate the processed signals $S(t)$ to be fed into the BNN with the SU. The BNN then outputs raw signals $O_r(t)$ which are in turn processed by the post-processing unit in order to generate the processed output signals $O(t)$. The dimensionality of each of these signals may be different. For instance, for the BNN to output one spike for a simple raw one-dimensional sinus signal of 1 hz frequency, it may be required to excite 100 different electrodes one after the other, each with a different temporal signal defined at a resolution of 100 hz. The pre-processing unit 610 may be adapted accordingly. The pre-processing unit 610 as well as the post-processing unit 630 may also use machine learning. In the latter embodiment, three sub-systems may be trained to reach the goal of overall minimizing the difference between the target signals and the measured final output signals 135 for predefined input signals 105. Note that as the BNN technology develops, it may also be possible to implement the pre-processing unit 610 and/or the post-processing unit 630 in wetware rather than in software or hardware, for instance as a simple BNN, so as to progressively build a more complex system suitable to learn higher cognitive functions.

The BOS 750 thus integrates both health monitoring and functional control of the BNN culture 120 in order to provide real-time sustainable and reliable BNN computing operations (including learning) to an end user, by achieving the following functions:

Homeostatic function, which works by optimizing the BNN functional interface 730 and the ECCU parameters 710 to ensure a constant level of performance;

Learning function, which works by optimizing the BNN interface (possibly including on the input side signal pre-processing and/or on the output side signal post-processing algorithms) jointly with the ECCU parameters required to learn new input/output associations. In particular the functional control software 701 is capable of adjusting in real-time the supply of additives and/or the values of environmental parameters for the BNN health control to facilitate optimal learning on the training set, in closed-loop coordination with the stimulation and readout signals as processed by the BNN functional interface.

Maintenance function, which may require cloning of aging BNN cultures so that they directly operate on training sets that have already been learnt by a pre-existing BNN. At least part of the BNN interface and ECCU parameters of the pre-existing BNN may then be retrieved from the database 720 and replicated to accelerate the learning time on the new BNN.

BNN Automated Learning

The intrinsic dynamic interconnectivity of neurons cells is seen as a mean to create (re)programmable functions based on data feed, which constitutes the necessary building block for machine learning. As will be apparent to those skilled in the art of neuroscience, the BNN system may be first trained with an input data signal 105 until it reaches a stable state giving the desired output data signal 135, also for inputs that were not fed during training. When the BNN is able to associate the target output data signal to the input data signal as expected, the system may be said to have learnt and generalized, as it can produce a deterministic response when fed with a given input.

In order to train the BNN, the automation controller may adapt the input spatiotemporal signal 605 for the stimulation unit SU to both the input data signal 105 and to the output spatiotemporal data signal 135 until the output spatiotemporal data signal 135 matches the target output data signal. The automation controller may further adapt at least one or more of:
the BNN core unit environmental parameters;
the BNN neural cell culture nutrient supply;
the BNN neural cell culture additive supply;
the BNN neural cell culture nutrient waste collection;
the BNN neural cell culture additive waste collection;
the BNN interface signal pre-processing algorithm parameters;
the BNN interface signal post-processing algorithm parameters;
until the output spatiotemporal data signal matches the expected output data signal.

Figure 8:
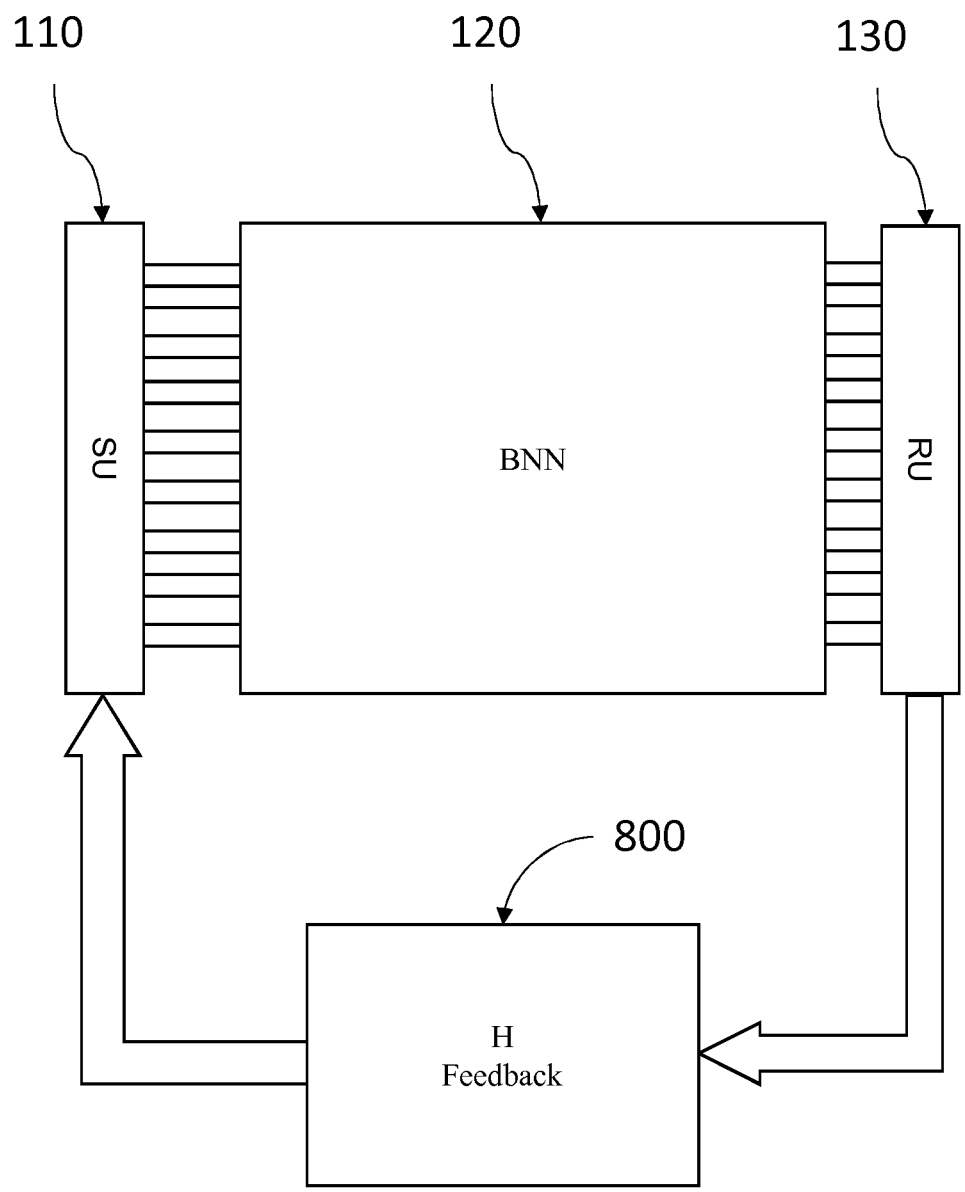
FIG. 8 illustrates a learning process as may be implemented by the real time processing software.

FIG. 8 illustrates a learning process as may be implemented by the real time processing software, with a feedback loop H 800 to adapt the stimulation signals 605 to the measured readout signals 635. In a possible embodiment, the real time processing software may trigger the periodic repetition of a stimulation signal 605 onto the BNN to encourage long-term potentiation. More generally the environmental parameters and the chemical parameters as controlled by the health monitoring system may also be part of a closed loop learning system. In a possible embodiment, the real time processing software may trigger the delivery of a dose of a drug known to reinforce the BNN as a reward when the measured readout signals 635 are in line with the training set expected signals for a given stimulation signal input.

In still further possible embodiments (not illustrated), the BNN may be in connection with external information sources such as for instance the Internet Web databases through the BNN automation controller interfaces. It may further learn to access and use this external information as a source to learn even more, linking new concepts, and develop further high-level cognitive capability over time.

BNN Biological Computing Stack

For the feedback loop to operate, close control of the BNN core unit is necessary. The proposed automated vascularisation systems may be limited to the growth and maintenance of relatively small BNN cultures in comparison with a mammal brain, e.g. in the order of magnitude of 10000 interconnected neurons. Therefore, it may not be enough to integrate one BNN core unit into the BNN computing system to learn and operate high-level cognitive functions. This limitation may be overcome by a BNN Biological Computing Stack (BCS), as represented on FIG. 9a) ad FIG. 9b). In a possible embodiment, one or more BNN core units may be arranged serially. The readout unit RU of a first BNN core unit may be connected to the stimulation unit SU of a next BNN core unit, or alternately they may be merged in a single hardware. At each interface between blocks, the system may also accept an external stimulation signal input 900 (ES) as represented by FIG. 9b).

As a possible embodiment, 2D BNN core units may be stacked vertically. In another possible embodiment BNN core units manufactured as stacks of neurospheres or layers of 3D bioprinted material may be mechanically arranged as a serial stack with the electrophysiology probes inserts at the interface between two adjacent units.

As represented on FIG. 9b), the learning process may be controlled end-to-end with the feedback loop operating between the last readout unit and the first stimulation unit, in an arrangement similar to deep learning layered architectures. In this configuration, the feedback element is used as a stabilizer, due to the inherent nature of biological neural network, which changes its internal state even without external stimulation.

FIG. 10a) and FIG. 10b) show two further embodiments of an adaptive closed loop system to control the BNN Computing Stack with further non-linear gain P 1000, respectively with and without an additional post-processing block O 1010. As will be apparent to those skilled in the art of deep learning, the pre-processing block P may facilitate the learning process, and the post-processing block O may represent a topology for reservoir computing. This configuration enables a trainable bio-computing stack (T-BCS).

FIG. 11 illustrates a specific realization related to FIG. 10b) where the O output signal post-processing block 1010 is realized with an artificial neural network (ANN). The Biological Neural Network (BNN) 120 is connected to the digital interfaces Readout Unit (RU) and Stimulation Unit (SU) by means of a Multi-electrodes Array (MEA) 1135. The feedback function (H1) 1137 corresponds to the learning process of the ANN, for example but not limited to a backpropagation. The outer feedback function (H2) 1136 corresponds to a mean to impose long term potentiation to the BNN. The outer feedback function H2 may be achieved with genetic programming or machine learning, so as to determine the correct spatiotemporal sequence that will make the desired spiking at the output of the BNN culture 120. Another way to impose long term potentiation is to use RU as a stimulation unit with the desired spiking sequence, which will strengthen the inner connections inside the BNN. Using this approach, the ANN may even be omitted in some embodiments.

Let S(t) be a periodic data input function that depends on time (t) for the different stimulation units $S_t$ of the MEA. Let O(t) be the data output function that depends on time (t) for the different read-out units $O_r$ of the MEA, for a given S(t).

Then H2 is a function or an algorithm (found by example with the help of genetic programming or machine learning) that minimizes (or maximizes) a scalar metric L so that when L is minimal (or maximal) for an arbitrary number of periods P, the BNN produces always the same spiking temporal function O(t) for a given input S(t). L is known as a loss (or reward) function.

For example, L might be:

$$L = \sum_i \sum_{t=0}^{(P-1)\cdot N} \frac{1}{2}\left(\vec{O}_i(t) - \vec{O}_i(t+N)\right)^2$$

where N is the period of the input function S(t). In this case the function or algorithm H2 will minimize L.

FIG. 12 illustrates a further possible embodiment of the realization of FIG. 11 to facilitate maintenance of the T-BCS operation over time. Indeed, the BNN culture 120 may evolve over time out of its initial (learnt) structure, thus possibly causing a drift in the T-BCS data outputs. This may be monitored by periodically testing the T-BCS operation with a validation set comprising one or more of the initial signals training set as SU inputs. The output of the T-BCS readout unit RU may then be checked against the expected prediction set and if they differ too much, the T-BCS has to re-apply a learning process. As the learning process takes time and disrupts the T-BCS function, in a possible embodiment the T-BCS system is replaced with a new one that has been prepared in advance.

BNN Server

The proposed automated BNN system, BNN Operating System (BOS) and trainable BNN Computing Stack (T-BCS) may provide the core architecture for a wetware-based computing server. Such a BNN server may be more suitable for providing high-level cognitive processing more efficiently than conventional software and hardware-based server architectures.

As represented by FIG. 13, the T-BCS wetware architecture may operate with a host providing different services to a user client. FIG. 14 further depicts possible functions as may be operated by the host server to manage a user client, such as handling requests, scheduling jobs, reporting and recording logs, maintaining dashboards, and invoicing. FIG. 15 further depicts a generic architecture with load balancing for serving multiple clients from the same T-BCS server host.

Preferably the BNN server supports redundant T-BCS operation so that one T-BCS may be removed for maintenance (e.g. re-learning) while at least one other T-BCS remains in operation to serve the client requests.

BNN Maintenance and Renewal
Exemplary Application

FIG. 16b) shows a possible application of a T-BCS server as a reverse image search service in comparison to a conventional deep learning server 16a). In legacy application of FIG. 16a), as implemented for instance by Google, a reverse image search service takes an image as input, and tells you where this image appears on the net, gives a description of the image, and possibly returns also a collection of similar images. The prior art reverse image search backend of FIG. 16a) uses several different image processing or image vision systems 1613 in order to obtain a robust compact representation of an image, typically as a hashed value 1614. The proposed application replaces the complete backend processing by a T-BCS 1615, with significant power consumption reduction for the same computing capabilities. In particular, once properly trained, the Biological Computing Stack (BCS) may advantageously replace both the features extraction part, consisting of a machine learning AI network, or a feature descriptors extractor algorithm, or a perceptual hashing function, or additional image processing tasks, or any combination of these tasks, and the so-called hashing post processing needed to obtain a compact representation of the image to be stored in the database.

OTHER EXPERIMENTS, EMBODIMENTS AND APPLICATIONS

FIG. 17 shows a ~200 m wide neurosphere after 4 days of maturation of rat cortical stem cells in a medium made DMEM-F12 supplemented with Glutamax™, Fibroblast Growth Factor, Epiderman Growth Factor and Stempro®. In a possible embodiment, 3D electrodes may be distributed over the surface of the neurosphere (or any other type of neuron aggregates). After growth stimulation, the tip of the electrodes will then progressively fit inside the grown-up neurosphere. FIGS. 18-19-20 schematically show an example of 12 electrodes regularly distributed along a virtual circumference of a neurosphere of cortical neural stem cells, which grows from 400 m to over 1 mm over 15 days, so that the tip of each electrode naturally becomes embedded deeper into the neurosphere. In this specific case, the growth is stimulated by Matrigel® matrix, as for instance the one obtained by extraction from Engelbreth-Holm-Swarm (EHS) mouse sarcoma.

Matrices can also be used in order to stimulate a 3D growth of the neural cells directly on the MEA. This illustrated on FIG. 21 where adherent cells 2120 are grown so that they extend their neurites 2121, 2122 or they migrate through the Matrigel® matrix 2100. This enables to obtain much thicker networks which can potentially extend over several millimeters above the MEA surface 210. FIG. 22 shows a microscopic image of adherent cells 2201 and Matrigel® 2202 including neural cells as grown over an MEA surface. As will be apparent to those skilled in the art, the same principle also applies to neurospheres or any aggregates of neural cells.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

As will be apparent to those skilled in the art of digital data communications, the methods described herein may be indifferently applied to various data structures such as data files or data streams. The terms data, data structures, data fields, file, or stream may thus be used indifferently throughout this specification.

Although the detailed description above contains many specific details, these should not be construed as limiting the scope of the embodiments but as merely providing illustrations of some of several embodiments.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methods are sufficiently flexible and configurable such that they may be utilized in ways other than that shown.

Although the term at least one may often be used in the specification, claims and drawings, the terms a, an, the, said, etc. also signify at least one or the at least one in the specification, claims and drawings.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, units, or mechanisms. Modules or units may constitute either software modules (e.g., code embodied on a machine-readable medium or in a transmission signal) or hardware modules. A hardware module is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, biologically or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations. As synthetic biology develops, all or part of the hardware module may be made of biological cells, such as neurospheres and/or genetically engineered cells (also known as wetware).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, processor-implemented module refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an algorithm is a self-consistent sequence of operations or similar processing leading to a desired result. In this context, algorithms and operations involve physical manipulation of physical quantities.

Although an overview of the inventive subject matter has been described with reference to specific example embodiments, various modifications and changes may be made to these embodiments without departing from the broader spirit and scope of embodiments of the present invention. For example, various embodiments or features thereof may be mixed and matched or made optional by a person of ordinary skill in the art. Such embodiments of the inventive subject matter may be referred to herein, individually or collectively, by the term invention merely for convenience and without intending to voluntarily limit the scope of this application to any single invention or inventive concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. An automated processing system comprising:
   an in vitro biological neural network (BNN) culture of neural cells in a BNN core unit;
   an input stimulation unit to apply an input spatio-temporal stimulation signal into a first set of the neural cells;
   an output readout unit to capture an output spatio-temporal readout signal from a second set of the neural cells;
   one or more nutrient tanks in connection with one or more nutrient dispensers to inject one or more nutrients into the BNN culture;
   one or more additive tanks each in connection with one or more additive dispensers to inject one or more additives into the BNN culture;
   one or more nutrient waste collectors to filter and expel nutrient waste from the BNN culture;
   one or more additive waste collectors to filter and expel additive waste from the BNN culture;
   one or more vascularization networks to connect said nutrient dispensers, additive dispensers, nutrient waste collectors and additive waste collectors to the BNN culture;
   one or more sensors to measure at least one environmental parameter of the BNN culture; and
   an automation controller to adapt the stimulation signal to a spatio-temporal input data signal, to adapt a spatio-temporal output data signal to the readout signal and to control at least one of:
   a BNN core unit environmental parameter;
   a BNN culture nutrient supply;
   a BNN culture additive supply;
   a BNN culture nutrient waste collection;
   a BNN culture additive waste collection;
   to maintain the homeostasis of the BNN culture over time so that the spatio-temporal input data signal is continuously transformed into the spatio-temporal output data signal,
   wherein one or more additive dispensers include a valve, an injector, a pump or a digitally controlled micro-pump to deliver additives to the BNN culture and wherein the automation controller is to adjust in real-time the additive supply until the spatio-temporal output data signal matches a desired output data signal.

2. The automated processing system of claim 1, wherein the nutrients are chosen among amino acids, carbohydrates, vitamins and minerals or a combination thereof.

3. The automated processing system of claim 1, wherein the one or more additives are chosen among a dose of a drug known to reinforce the BNN as a reward when the spatio-temporal output data signal matches a desired output data signal for a given stimulation signal input, a dopaminergic stimulation enhancer to increase the dopaminergic response of the BNN, a dopaminergic stimulation inhibitor to decrease the dopaminergic response of the BNN, botox, nicotine, curare, amphetamine, cocaine, MDMA, strychnine, THC, caffeine, benzodiazepines, barbiturates, alcohol, opiates, growth factors, hormone, a gaz, or a combination thereof.

4. The automated processing system of claim 1, wherein the vascularization network is manufactured using 3D bioprinting using a biocompatible material.

5. The automated processing system claim 1, wherein the vascularization network is grown from stem cells on the BNN culture support.

6. The automated processing system of claim 1, wherein the vascularization network is a 3D structure suitable to mechanically host the BNN cells in its pores while adjusting to their growth development as a 3D cell culture.

7. The automated processing system of claim 1, wherein the sensor measures the temperature, the hygrometry, the pH or the $CO_2$ environmental parameter of the BNN culture.

8. The automated processing system of claim 1, wherein the automation controller further comprises a pre-processing unit to transform, with at least one of a spatio-temporal signal filter, a spatio-temporal signal classifier, a machine learning algorithm based on a mathematical or statistical model, an artificial neural network, a convolutional neural network, a support vector machine classifier, a random forest classifier, a genetic algorithm, a genetic programming algorithm, or a reservoir computing method, the input data signal into the stimulation signal.

9. The automated processing system of claim 1, wherein the automation controller further comprises a post-processing unit to transform with at least one of a spatio-temporal signal filter, a spatio-temporal signal classifier, a machine learning algorithm based on a mathematical or statistical model, an artificial neural network, a convolutional neural network, a support vector machine classifier, a random forest classifier, a genetic algorithm, a genetic programming algorithm, or a reservoir computing method, the readout signal into the output data signal.

10. The automated processing system of claim 1, further adapted to control a stack of BNN core units, the first part of the BNN culture being in a first BNN core unit from said stack and the second part of the BNN culture being in a second BNN core unit from said stack.

11. A server for executing automated processing tasks, the server comprising the automated processing system of claim 1.

12. A method of transforming a spatio-temporal input data signal into a spatio-temporal output data signal with an automation controller and a Biological Neural Network (BNN) core unit, the BNN core unit comprising at least an in vitro culture of neural cells (the BNN culture) adapted, with an input stimulation unit, to feed a stimulation spatio-temporal signal into a first set of the neural cells and adapted, with an output readout unit, to readout a spatio-temporal signal from a second set of the neural cells, the method comprising:

pre-processing, with the automation controller, the spatio-temporal input data signal into the stimulation spatio-temporal signal;

applying, with an input stimulation unit (SU), the stimulation spatio-temporal signal into a first set of neural cells of an in vitro culture of neural cells (the BNN culture);

reading, with an output readout unit (RU), a spatio-temporal signal from a second set of the neural cells;

post-processing, with the automation controller, the readout spatio-temporal signal into the spatio-temporal output data signal; and controlling, with the automation controller, at least one of:
  a BNN core unit environmental parameter;
  a BNN culture nutrient supply;
  a BNN culture additive supply;
  a BNN culture nutrient waste collection;
  a BNN culture additive waste collections;
  a pre-processing parameter;
  a post-processing parameter;

to maintain the homeostasis of the BNN neural cell culture over time so that the BNN core unit continuously transforms the spatio-temporal input data signal into the spatio-temporal output data signal;

injecting, with one or more additive dispensers, one or more additives from one or more additive tanks into the BNN culture;
  receiving a target spatio-temporal output data signal;
  adjusting in real-time, with the automation controller, the additive supply until the spatio-temporal output data signal matches the target spatio-temporal output data signal.

13. The method of claim 12, further comprising
receiving a target spatio-temporal output data signal;
adapting at least one of:
  the BNN core unit environmental parameters;
  the BNN culture nutrient supply;
  the BNN culture additive supply;
  the BNN culture nutrient waste collection;
  the BNN culture additive waste collection;
  a pre-processing parameter;
  a post-processing parameter;
to minimize the error between the output spatio-temporal data signal and the target spatio-temporal output data signal.

14. The method of claim 12, wherein pre-processing comprises transforming, with at least one of a spatio-temporal signal filter, a spatio-temporal signal classifier, a machine learning algorithm based on a mathematical or statistical model, an artificial neural network, a convolutional neural network, a support vector machine classifier, a random forest classifier, a genetic algorithm, a genetic programming algorithm, a reservoir computing method, the spatio-temporal input data signal into the stimulation spatio-temporal signal.

15. The method of claim 12, wherein post-processing comprises transforming, with at least one of a spatio-temporal signal filter, a spatio-temporal signal classifier, a machine learning algorithm based on a mathematical or statistical model, an artificial neural network, a convolutional neural network, a support vector machine classifier, a random forest classifier, a genetic algorithm, a genetic programming algorithm, a reservoir computing method, the readout spatio-temporal signal into the spatio-temporal output data signal.

16. The method of claim 12, wherein the one or more additives comprise a dose of a drug known to reinforce the BNN as a reward when the spatio-temporal output data signal matches a desired output data signal for a given stimulation signal input.

17. The method of claim 12, wherein one or more additive dispensers include a valve, an injector, a pump or a digitally controlled micro-pump for injecting one or more additives from one or more additive tanks into the BNN culture.

* * * * *